(12) United States Patent
Mizutani

(10) Patent No.: US 6,344,509 B1
(45) Date of Patent: Feb. 5, 2002

(54) THERMOPLASTIC RESIN COMPOSITIONS

(75) Inventor: Yoshinobu Mizutani, Yokkaichi (JP)

(73) Assignee: Taiyo Kagaku Co., Ltd., Yokkaichi (JP)

(*) Notice: Subject to any disclaimer, the term of this patent is extended or adjusted under 35 U.S.C. 154(b) by 0 days.

(21) Appl. No.: 08/696,952

(22) PCT Filed: Dec. 12, 1995

(86) PCT No.: PCT/JP95/02628

§ 371 Date: Aug. 22, 1996

§ 102(e) Date: Aug. 22, 1996

(87) PCT Pub. No.: WO96/19532

PCT Pub. Date: Jun. 27, 1996

(30) Foreign Application Priority Data

| Dec. 22, 1994 | (JP) | 6-336207 |
|---|---|---|
| Mar. 22, 1995 | (JP) | 7-090225 |
| Aug. 4, 1995 | (JP) | 7-219823 |

(51) Int. Cl.$^7$ ............................ C08K 5/09
(52) U.S. Cl. ............ 524/322; 524/13; 524/284; 524/310; 524/311; 524/312; 524/313; 524/317; 524/318; 524/373; 524/376; 524/423; 524/425; 524/431; 524/436; 524/437; 524/445; 524/447; 524/451; 524/494; 524/496; 524/497; 524/514; 524/533
(58) Field of Search .............. 524/310, 311, 524/313, 317, 533, 284, 312, 318, 322, 373, 376, 13, 423, 425, 431, 436, 437, 445, 447, 451, 494, 496, 497, 514

(56) References Cited

U.S. PATENT DOCUMENTS

| 3,755,200 | A | * | 8/1973 | Rhodes et al. ............ 252/400 |
| 3,881,942 | A | * | 5/1975 | Buckwalter ............... 106/22 |
| 3,928,267 | A | * | 12/1975 | Rhodes et al. ............ 252/406 |
| 4,189,420 | A | * | 2/1980 | Sugimoto et al. ......... 526/5 |
| 4,274,987 | A | | 6/1981 | Augustyn |
| 4,574,136 | A | * | 3/1986 | Gomez .................... 524/310 |
| 4,698,099 | A | * | 10/1987 | Nakamura et al. ........ 106/288 R |
| 4,767,465 | A | * | 8/1988 | Nakamura et al. ........ 106/413 M |
| 4,954,177 | A | * | 9/1990 | Schofield ................ 524/311 |
| 5,011,629 | A | * | 4/1991 | Bilbo .................... 524/306 |
| 5,025,060 | A | * | 6/1991 | Yabuta et al. ........... 524/533 |
| 5,126,391 | A | * | 6/1992 | Yamamoto et al. ........ 524/311 |
| 5,137,955 | A | * | 8/1992 | Tsuchiya et al. ......... 524/313 |
| 5,334,670 | A | * | 8/1994 | Uchida et al. ........... 525/440 |
| 5,346,944 | A | * | 9/1994 | Hayashida et al. ........ 524/313 |
| 5,420,315 | A | * | 5/1995 | Uhrig et al. ............. 554/96 |

FOREIGN PATENT DOCUMENTS

| EP | 0240160 | 10/1987 |
| JP | 58-79043 | 5/1983 |
| JP | 62-235252 | 10/1987 |
| JP | 1-90234 | 4/1989 |
| JP | 4-91150 | 3/1992 |
| JP | 4-202429 | 7/1992 |
| JP | 49-55752 | 8/1993 |

OTHER PUBLICATIONS

Patent Abstracts of Japan, vol. 018, No. 248 (C–1198) (Abstract date May 12, 1994) JP 06 031152 A (Feb. 8, 1994).
Patent Abstracts of Japan, vol. 018, No. 163 (C–1181) (Abstract date Mar. 18, 1994) JP 05 331023 A (Dec. 14, 1993).
Patent Abstracts of Japan, vol. 018, No. 219 (C–1192) (Abstract date Apr. 20, 1994) JP 06 015157 A (Jan. 25, 1994).
Patent Abstracts of Japan, vol. 018, No. 266 (E–1551) (Abstract date May 20, 1994) JP 06 045127 A (Feb. 18, 1994).

* cited by examiner

*Primary Examiner*—Judy M. Reddick
(74) *Attorney, Agent, or Firm*—Birch, Stewart, Kolasch & Birch, LLP

(57) ABSTRACT

The present invention relates to a thermoplastic resin composition characterized by comprising (A) a thermoplastic resin, (B) an inorganic filler and/or organic filler, and (C) a polyhydroxy alcohol ester of condensed hydroxyfatty acid and/or (C') a condensed hydroxyfatty acid having a degree of condensation exceeding 3. Also, it relates to a method for producing the thermoplastic resin, comprising the steps of blending (C) a polyhydroxy alcohol ester of condensed hydroxyfatty acid and/or (C') a condensed hydroxyfatty acid having a degree of condensation exceeding 3 with (A) a thermoplastic resin previously blended with (B) an inorganic filler and/or organic filler, and melt-kneading the resulting mixture; and to a method for producing the thermoplastic resin composition, comprising the steps of blending (C) a polyhydroxy alcohol ester of condensed hydroxyfatty acid and/or (C') a condensed hydroxyfatty acid having a degree of condensation exceeding 3 at a high concentration with (A) a thermoplastic resin previously blended with (B) an inorganic filler and/or organic filler and blending and/or compounding the above mixture while diluting with (A) a thermoplastic resin or (A) a thermoplastic resin blended with an inorganic filler and/or organic filler.

20 Claims, No Drawings

THERMOPLASTIC RESIN COMPOSITIONS

TECHNICAL FIELD

The present invention relates to a filler-containing thermoplastic resin, more specifically to a thermoplastic resin composition having good flowability and improved impact strength, bending strength and other mechanical properties, toughness and heat stability.

BACKGROUND ART

Traditionally, thermoplastic resins, represented by polyolefin resin, ABS resin and vinyl chloride resin, have been widely used in large amounts because of their excellency in terms of mechanical, electrical and other properties. It is common practice to add inorganic fillers to thermoplastic resins to improve their various properties, including rigidity, impact resistance, weather resistance, dimensional stability, flame retardance, painting property, adhesiveness and color-imparting property. It should be noted, however, that such practice poses problems, including difficult molding owing to reduced thermoplastic resin flowability, deteriorated product appearance owing to poor surface condition, and brittleness owing to reduced toughness. Large amounts of inorganic fillers are often used to improve rigidity, which causes another problem of decreased impact and weather resistance.

As solutions to these problems, there have been proposed some methods involving addition of particular compounds. Such methods include the addition of an ethylene oxide surfactant having a particular HLB value (index of balance between hydrophilic and lipophilic groups, expressed as the value calculated by setting 0% quantity of hydrophilic groups, such as hydroxyl groups, in a molecule as 0 and 100% quantity of hydrophilic groups in a molecule as 20.) (Japanese Patent Laid-Open No. 58-79043), the improvement of moldability and mold release property by the addition of a glycerol ester of higher fatty acid to polycarbonate resin (Japanese Patent Laid-Open No. 49-55752), the improvement of workability by the addition of a glycerol ester of fatty acid to polyolefin resin containing an inorganic powder (Japanese Patent Laid-Open Nos. 64-90234 and 01-90234), and the improvement of moldability and mold release property by the addition of a glycerol triester of fatty acid to polystyrene resin (Japanese Patent Laid-Open No. 04-91150). However, none of these methods provide satisfactory products.

Another method has been proposed in which an ester consisting of polyglycerol and fatty acid is used as a polymer quality-improving agent (Japanese Patent Laid-Open No. 04-202429). However, although the ester has a polymer surface-improving effect, it has no effect on improving strength and moldability as described herein, and also it fails to provide satisfactory products because of poor flowability and heat resistance.

Also, there is a known method in which a dispersing agent derived from hydroxycarboxylic acid is used in producing a dispersion composition of a finely divided ceramic solid and a thermoplastic resin (Japanese Patent Laid-Open No. 62-235252). However, the method does not provide satisfactory products in terms of mechanical properties and heat stability, because the degree of condensation of the hydroxyfatty acid-derived dispersing agent used in the method is as low as 1 to 3, although it enables the obtainment of a dispersion composition.

DISCLOSURE OF THE INVENTION

An object of the present invention is to provide a thermoplastic resin composition which contains an inorganic filler and/or organic filler, and which has good flowability and toughness, and improved impact strength, bending strength and other mechanical properties, and heat stability.

The present inventors found that a thermoplastic resin composition containing (A) a thermoplastic resin, (B) an inorganic filler and/or organic filler, and (C) a polyhydroxy alcohol ester of condensed hydroxyfatty acid and/or (C') a condensed hydroxyfatty acid having a degree of condensation exceeding 3 presents good solutions to the above problems. The present inventors made further investigation based on this finding, and completed the present invention.

Specifically, the present invention is concerned:

1. A thermoplastic resin composition characterized by comprising (A) a thermoplastic resin; (B) an inorganic filler and/or organic filler; and (C) a polyhydroxy alcohol ester of condensed hydroxyfatty acid and/or (C') a condensed hydroxyfatty acid having a degree of condensation exceeding 3;
2. The thermoplastic resin composition described in Item 1 above, wherein a condensed hydroxyfatty acid, which is a constituent of (C) a polyhydroxy alcohol ester of condensed hydroxyfatty acid, is a product obtained by a dehydration polymerization of one or more kinds selected from the group consisting of C12 to C20 hydroxyfatty acids;
3. The thermoplastic resin composition described in Item 2 above, wherein the condensed hydroxyfatty acid, which is a constituent of (C) a polyhydroxy alcohol ester of condensed hydroxyfatty acid, is a product obtained by a dehydration polymerization of one or more kinds selected from the group consisting of 9-hydroxystearic acid, 10-hydroxystearic acid, 12-hydroxystearic acid, ricinoleic acid, and hydrogenated castor oil;
4. The thermoplastic resin composition described in any one of Items 1 to 3 above, wherein the condensed hydroxyfatty acid, which is a constituent of (C) a polyhydroxy alcohol ester of condensed hydroxyfatty acid, has a degree of condensation exceeding 1;
5. The thermoplastic resin composition described in Item 4 above, wherein the condensed hydroxyfatty acid has a degree of condensation of 3.5 to 7;
6. The thermoplastic resin composition described in any one of Items 1 to 5 above, wherein the polyhydroxy alcohol, which is a constituent of (C) a polyhydroxy alcohol ester of condensed hydroxyfatty acid, is one or more kinds selected from the group consisting of polyglycerol and pentaerythritol;
7. The thermoplastic resin composition described in Item 6 above, wherein the polyhydroxy alcohol, which is a constituent of (C) a polyhydroxy alcohol ester of condensed hydroxyfatty acid, is one or more polyglycerols selected from the group consisting of diglycerol, triglycerol, tetraglycerol, pentaglycerol, hexaglycerol, and decaglycerol;
8. The thermoplastic resin composition described in any one of Items 1 to 7, wherein (C) a polyhydroxy alcohol ester of condensed hydroxyfatty acid is one or more compounds selected from the group consisting of a tetraglycerol ester of condensed ricinoleic acid, a hexaglycerol ester of condensed ricinoleic acid, an octaglycerol ester of condensed ricinoleic acid, a decaglycerol ester of condensed ricinoleic acid, a tetraglycerol ester of condensed 12-hydroxystearic acid, a hexaglycerol ester of condensed 12-hydroxystearic acid, an octaglycerol ester of condensed 12-hydroxystearic acid, and a decaglycerol ester of condensed 12-hydroxystearic acid;
9. The thermoplastic resin composition described in Item 1 above, wherein the degree of condensation of (C') a condensed hydroxyfatty acid having a degree of condensation exceeding 3 is in the range of from 4 to 7;

10. The thermoplastic resin composition described in Item 1 or 9, wherein a hydroxycarboxylic acid, which is a constituent of (C') a condensed hydroxyfatty acid having a degree of condensation exceeding 3, is one or more kinds selected from the group consisting of ricinoleic acid, 9-hydroxystearic acid, 10-hydroxystearic acid, 12-hydroxystearic acid, and fatty acids derived from hydrogenated castor oil;

11. The thermoplastic resin composition described in any one of Items 1 to 10 above, wherein (B) an inorganic filler and/or organic filler is one or more substances selected from the group consisting of extenders, reinforcements, ceramics, flame retardants, and magnetic materials;

12. The thermoplastic resin composition described in Item 11 above, wherein (B) an inorganic filler and/or organic filler is one or more substances selected from the group consisting of calcium carbonate, talc, clay, kaolin, aluminum hydroxide, magnesium hydroxide, barium sulfate, iron oxide, titanium oxide, glass beads, glass fibers, carbon fibers, aramid fibers, decabromodiphenyl ether and wood flours;

13. The thermoplastic resin composition described in any one of Items 1 to 12, wherein (A) a thermoplastic resin is one or more substances selected from the group consisting of low-density polyethylene, high-density polyethylene, linear polyethylene, polypropylene, polyvinyl chloride, polystyrene, acrylonitrile-butadiene-styrene copolymer, and polyamide resin;

14. The thermoplastic resin composition described in any one of Items 1 to 13 above, wherein the thermoplastic resin composition containing (B) an inorganic filler and/or organic filler in an amount of 0.01 to 98% by weight is blended with (C) a polyhydroxy alcohol ester of condensed hydroxyfatty acid and/or (C') a condensed hydroxyfatty acid having a degree of condensation exceeding 3 in an amount of 0.05 to 20 parts by weight based upon 100 parts by weight of (B) an inorganic filler and/or organic filler;

15. A method for producing the thermoplastic resin described in any one of Items 1 to 14 above, comprising the steps of:

blending (C) a polyhydroxy alcohol ester of condensed hydroxyfatty acid and/or (C') a condensed hydroxyfatty acid having a degree of condensation exceeding 3 with (A) a thermoplastic resin previously blended with (B) an inorganic filler and/or organic filler; and melt-kneading the resulting mixture; and 16. A method for producing the thermoplastic resin composition described in any one of Items 1 to 14 above, comprising the steps of:

blending (C) a polyhydroxy alcohol ester of condensed hydroxyfatty acid and/or (C') a condensed hydroxyfatty acid having a degree of condensation exceeding 3 at a high concentration with (A) a thermoplastic resin previously blended with (B) an inorganic filler and/or organic filler; and blending and/or compounding the above mixture while diluting with (A) a thermoplastic resin or (A) a thermoplastic resin blended with an inorganic filler and/or organic filler.

BEST MODE FOR CARRYING OUT THE INVENTION (1) Polyhydroxy Alcohol Ester of Condensed Hydroxyfatty Acid The polyhydroxy alcohol ester of condensed hydroxyfatty acid used as a component of the thermoplastic resin composition of the present invention is an ester prepared by allowing a condensed hydroxyfatty acid to react with a polyhydroxy alcohol.

The polyhydroxy alcohols used as a starting material for the polyhydroxy alcohol ester of condensed hydroxyfatty acid in the present invention are exemplified by alkane polyols, such as pentaerythritol and glycerol; saccharides, such as sucrose; saccharide derivatives, such as those represented by sugar alcohols including sorbitol and mannitol; polyglycerols, such as pentaglycerol, hexaglycerol and decaglycerol; and polyalkane polyols, represented by dipentaerythritol and tripentaerythritol. These polyhydroxy alcohols may be used singly or in mixture of two or more kinds. Preferred polyhydroxy alcohols are polyglycerols and pentaerythritol, with a greater preference given to polyglycerols having a degree of polymerization of 2 to 10, more preferably those having a degree of polymerization of 4 to 8.

The condensed hydroxyfatty acids used as another starting material for the polyhydroxy alcohol ester of condensed hydroxyfatty acid in the present invention is a condensation product of hydroxyfatty acid. The term "degree of condensation" as used herein, is defined as a value obtained using equation (1) below.

(Degree of condensation)=(acid value of fatty acid before condensation)/(acid value of fatty acid after condensation)     (1)

Here, the term "acid value" is defined as the amount in milligram unit of the potassium hydroxide (chemical formula=KOH, molecular weight=56.11) required to neutralize the fatty acid, and is obtained using equation (2) below.

(Acid value)=[KOH]/[fatty acid]×1000     (2)

wherein [KOH] is the molecular weight of potassium hydroxide (56.11) and [fatty acid] is the average molecular weight of fatty acid.

In the case of a mixture of different fatty acids, fatty acid molecular weight is the average molecular weight calculated on the basis of the mixing ratio of all component fatty acids. For example, the acid value of a mixed fatty acid consisting of 50% by weight 12-hydroxystearic acid (molecular weight=298), 30% by weight ricinoleic acid (molecular weight=300) and 20% by weight stearic acid (molecular weight=284) was determined on condition that the average molecular weight was 295.8. The acid value of condensed hydroxyfatty acid is preferably between 10 and 100, more preferably between 20 and 50.

The degree of condensation of the condensed hydroxyfatty acid used for the polyhydroxy alcohol ester of condensed hydroxyfatty acid of the present invention normally exceeds 1, and is preferably not less than 3, more preferably between 3.5 and 7.

The above-described hydroxyfatty acid is a fatty acid having one or more hydroxyl groups in its molecular structure. Specifically, such fatty acids include ricinoleic acid, 12-hydroxystearic acid, hydrogenated castor oil fatty acids (fatty acids containing small amounts of stearic acid and palmitic acid as well as 12-hydroxystearic acid), sabinic acid, 2-hydroxytetradecanoic acid, ipurolic acid, 2-hydroxyhexadecanoic acid, jalapinolic acid, juniperic acid, ambrettolic acid, aleuritic acid, 2-hydroxyoctadecanoic acid, 18-hydroxyoctadecanoic acid, 9,10-dihydroxyoctadecanoic acid, kamlolenic acid, ferron acid, cerebronic acid, 9-hydroxystearic acid and 10-hydroxystearic acid. These fatty acids may be used singly or in mixture of two or more kinds. Preferable hydroxyfatty acids have 8 to 22 carbon atoms, more preferably 12 to 20 carbon atoms. Of such hydroxyfatty acids, ricinoleic acid, 12-hydroxystearic acid, 9-hydroxystearic acid, 10-hydroxystearic acid and hydrogenated castor oil fatty acids are preferred, with a greater preference given to ricinoleic acid and 12-hydroxystearic acid.

The polyhydroxy alcohol ester of condensed hydroxyfatty acid of the present invention is prepared by heating the above-mentioned starting materials in the presence or absence of phosphoric acid, p-toluenesulfonic acid, sodium hydroxide, or another catalyst, at 100 to 300° C., preferably 120 to 250° C., and removing the resulting water from the reaction system. The reaction is preferably carried out in the presence of an inert gas. The reaction may be carried out in an azeotropic solvent, such as toluene or xylene. The progress of reaction can be monitored by determining the amount of water produced and the reaction product's acid value. The polyhydroxy alcohol esters of condensed hydroxyfatty acids thus synthesized are exemplified by polyglycerol esters of condensed hydroxyfatty acid, pentaerythritol esters of condensed hydroxyfatty acid, dipentaerythritol esters of condensed hydroxyfatty acid, tripentaerythritol esters of condensed hydroxyfatty acid, sucrose esters of condensed hydroxyfatty acid, sorbitol esters of condensed hydroxyfatty acid, and mannitol esters of condensed hydroxyfatty acid. More specifically, such esters include tetraglycerol ester of condensed ricinoleic acid, tetraglycerol ester of condensed 12-hydroxystearic acid, hexaglycerol ester of condensed ricinoleic acid, hexaglycerol ester of condensed 12-hydroxystearic acid, octaglycerol ester of condensed ricinoleic acid, octaglycerol ester of condensed 12-hydroxystearic acid, decaglycerol ester of condensed ricinoleic acid, decaglycerol ester of condensed 12-hydroxystearic acid, pentaerythritol ester of condensed ricinoleic acid, pentaerythritol ester of condensed 12-hydroxystearic acid, dipentaerythritol ester of condensed ricinoleic acid, dipentaerythritol ester of condensed 12-hydroxystearic acid, tripentaerythritol ester of condensed ricinoleic acid, and tripentaerythritol ester of condensed 12-hydroxystearic acid. These esters may be used singly or in mixture of two or more kinds. Among them, esters formed between condensed ricinoleic acid or condensed 12-hydroxystearic acid and a polyglycerol having a degree of condensation of 2 to 10 are preferably used, examples of which include tetraglycerol ester of condensed ricinoleic acid, tetraglycerol ester of condensed 12-hydroxystearic acid, hexaglycerol ester of condensed ricinoleic acid, hexaglycerol ester of condensed 12-hydroxystearic acid, octaglycerol ester of condensed ricinoleic acid, octaglycerol ester of condensed 12-hydroxystearic acid, decaglycerol ester of condensed ricinoleic acid and decaglycerol ester of condensed 12-hydroxystearic acid.

The acid value Qf the polyhydroxy alcohol ester of condensed hydroxyfatty acid in the present invention is normally not more than 10, preferably not more than 5.

The preferable amount of polyhydroxy alcohol ester of condensed hydroxyfatty acid added in the present invention is 0.05 to 20 parts by weight, more preferably 0.1 to 5 parts by weight, based upon 100 parts by weight of filler. If the amount is below that range, the compound added fails to have the desired effect; if the amount is above that range, the compound added undesirably affects resin properties.

(1') Condensed Hydroxyfatty Acid

The condensed hydroxyfatty acid added to the thermoplastic resin composition of the present invention is a condensation product of hydroxyfatty acids. The term "degree of condensation" as used herein is defined as above.

The acid value of the condensed hydroxyfatty acid is preferably between 10 and 100, more preferably between 20 and 50.

The degree of condensation of the condensed hydroxyfatty acid added to the thermoplastic resin composition of the present invention is characterized by exceeding 3. If the degree of condensation is not more than 3, a large amount of hydroxyfatty acid remains unchanged, which undesirably impairs the effect of adding condensed hydroxyfatty acid. The degree of condensation is preferably not less than 3.5, more preferably between 4 and 7.

The above-described hydroxyfatty acid is a fatty acid having one or more hydroxyl groups in its molecular structure. Specifically, such fatty acids include ricinoleic acid, 12-hydroxystearic acid, hydrogenated castor oil fatty acids (fatty acids containing small amounts of stearic acid and palmitic acid as well as 12-hydroxystearic acid), sabinic acid, 2-hydroxytetradecanoic acid, ipurolic acid, 2-hydroxyhexadecanoic acid, jalapinolic acid, juniperic acid, ambrettolic acid, aleuritic acid, 2-hydroxyoctadecanoic acid, 18-hydroxyoctadecanoic acid, 9,10-dihydroxyoctadecanoic acid, kamlolenic acid, ferron acid, cerebronic acid, 9-hydroxystearic acid and 10-hydroxystearic acid. These fatty acids may be used singly or in mixture of two or more kinds. Preferable hydroxyfatty acids have 8 to 22 carbon atoms, more preferably 12 to 20 carbon atoms. Of such hydroxyfatty acids, ricinoleic acid, 12-hydroxystearic acid, 9-hydroxystearic acid, 10-hydroxyfatty acid and hydrogenated castor oil fatty acids are preferred, with a greater preference given to ricinoleic acid and 12-hydroxystearic acid.

The production method for the above-described condensed hydroxyfatty acid is not subject to limitation. For example, the condensed hydroxyfatty acid can be prepared by heating a hydroxycarboxylic acid or a mixture of different hydroxycarboxylic acids, in the presence of an esterification catalyst as necessary, preferably at a temperature between 160 and 220° C., to a desired degree of condensation (not less than 3, preferably not less than 3.5, more preferably between 4 and 7). The progress of esterification can be estimated by determining the reaction product's acid value. Preferably, the water resulting from the esterification is removed from the reaction system. Water formed can be removed by a nitrogen gas stream passing through the reaction mixture or by an azeotropic distillation while the reaction is carried out the presence of in an azeotropic solvent (e.g., toluene or xylene). The resulting condensed hydroxyfatty acid can be isolated by an ordinary method. When the reaction is carried out in the presence of an organic solvent and when the solvent does not affect the resin composition, it is also possible to use the resulting polyester solution.

Also, in the production of the condensed hydroxyfatty acid used for the present invention, it is preferable to add a condensation stopper because it enables the control of the degree of condensation of the condensed hydroxyfatty acid. Theoretically, when polymerization is carried out in the presence of n mol of a hydroxyfatty acid per mol of a condensation stopper, a polymer consisting of the condensed hydroxyfatty acid having a degree of condensation of n and the condensation stopper bound to one end thereof is obtained at the time of completion of the polymerization. For this reason, a condensed hydroxyfatty acid having an optimum degree of condensation can easily be synthesized, provided that polymerization is carried out by adding a particular amount of condensation stopper to the hydroxyfatty acid. The blending ratio of hydroxyfatty acid and condensation stopper need to be appropriately determined according to the degree of condensation of the desired condensed hydroxyfatty acid. If the molar ratio of condensation stopper and hydroxyfatty acid exceeds 1:0.5, condensation does not proceed and the desired degree of condensation required for the present invention is not achieved. The condensation stopper for the present invention is a fatty acid containing no hydroxyl groups in its molecular structure. Such fatty acids are not particularly limited, and generically include substances which have a carboxyl functional group and which are prepared by hydrolyzing natural fats and oils extracted from animals or plants, and purifying it with or without separation. The condensation stopper may also be a fatty acid chemically synthesized from petroleum, etc. It may also be obtained by subjecting such a fatty acid to hydrogenation reduction, etc. Of these substances, oleic acid and stearic acid are preferred.

The amount of the condensed hydroxyfatty acid added in the present invention is preferably 0.05 to 20 parts by weight, more preferably 0.1 to 5 parts by weight, based upon 100 parts by weight of filler.

(2) Thermoplastic Resin

Thermoplastic resins used for the present invention are not particularly limited, as long as they are melted by heating and solidified by cooling, and capable of showing reversible conversion between these two states. Such thermoplastic resins are exemplified by polyolefin resins, including low-density polyethylene, high-density polyethylene, linear polyethylene, polypropylene, ethylene-vinyl acetate copolymer, polybutadiene, polymethylpentene-1, polybutene-1, polypentene-1 and copolymers thereof; vinyl chloride resins, including vinyl chloride and vinyl chloride copolymers, such as vinyl chloride-vinyl acetate copolymer, vinyl chloride-vinylidene chloride copolymer, vinyl chloride-ethylene copolymer, copolymer resulting from grafting vinyl chloride to ethylene-vinyl acetate copolymer; styrene resins, such as polystyrene and acrylonitrile-butadiene-styrene copolymer; acrylic resins; engineering plastics, such as polycarbonate, polyamide, polyethylene terephthalate, polybutyrene terephthalate, polyphenylene oxide and polyphenylene sulfide; and blends of more than one polymers. Of these thermoplastic resins, low-density polyethylene, high-density polyethylene, linear polyethylene, polypropylene, polyvinyl chloride, polystyrene, acrylonitrile-butadiene-styrene copolymer and polyamide resin are preferred.

(3) Inorganic Filler and/or Organic Filler

In addition to extenders and reinforcements, the inorganic filler and/or organic filler used in the present invention is exemplified by ceramics, flame retardants and magnetic materials. Examples of inorganic fillers include calcium carbonate, diatomaceous earth, clay, kaolin, titanium oxide, calcium oxide, mica, silica, alumina, talc, barium sulfate, calcium sulfate, gypsum fibers, calcium silicate, montmorillonite, bentonite, activated clay, sepiolite, immogolite, sericite, red lead, zinc white, magnesium oxide, magnesium carbonate, calcium hydroxide, magnesium hydroxide, aluminum hydroxide, zinc carbonate, barium carbonate, dawsonite, hydrotalcite, glass beads, aluminum nitride, boron nitride, silicon nitride, glass flakes, glass fibers, alumina fibers, metal fibers, potassium titanate, wollastonite, xonotlite, phosphate fibers, whiskers, iron oxide, lead chromate, strontium chromate, carbon black, aluminum, iron, zinc, magnesium, brass, nickel, copper, stainless steel, metal oxide ceramics, non-oxide ceramics (silicon nitride, aluminum nitride, titanium nitride, silicone carbide, titanium carbide, tungsten carbide), antimony trioxide, tribasic lead sulfate, potassium titanate, lead titanate zirconate, molybdenum sulfide, silicon carbide, stainless steel fibers, zinc borate and slug fibers, with a preference given to calcium carbonate, talc, clay, kaolin, aluminum hydroxide, magnesium hydroxide, barium sulfate, iron oxide, titanium oxide, glass beads and glass fibers. Examples of organic fillers include carbon fibers, aramid fibers, vinylon fibers, Teflon, wood flours, pulp, rubber powders, and bromine-based flame retardants, such as decabromodiphenyl ether, with a preference given to carbon fibers, aramid fibers, decabromodiphenyl ether and wood flours. In the present invention, these fillers may be used singly or in combination of two or more kinds.

In the present invention, the polyhydroxy alcohol ester of condensed hydroxyfatty acid and/or condensed hydroxyfatty acid having a degree of condensation exceeding 3 is especially effective when the thermoplastic resin composition contains a filler in an amount of 0.01 to 98% by weight, preferably 15 to 98% by weight of the resin composition and these contents are commonly used.

When a thermoplastic resin composition consists of two components, resin and filler, and the content of an inorganic filler and/or organic filler is higher than 70% by weight of the resin composition, it is hard or impossible to knead the mixture. Adding a polyhydroxy alcohol ester of condensed hydroxyfatty acid and/or condensed hydroxyfatty acid having a degree of condensation exceeding 3, as in the present invention, to such mixture is particularly preferred, because it enables the kneading of such mixture, thereby making it possible to produce a resin composition containing an inorganic filler and/or organic filler at a high concentration (preferably 70 to 98% by weight).

(4) Other Ingredients

To confer desired properties according to the purposes, the composition of the present invention can of course further incorporate known substances commonly used in thermoplastic resins, including stabilizers, such as antioxidants, heat stabilizers and ultraviolet absorbents, antistatic agents, flame retardants, foaming agents, lubricants, plasticizers, crystallization promoters, crystalline core agents, and other inorganic fillers and organic fillers.

(5) Method of Compounding

The thermoplastic resin composition of the present invention is normally produced by melt-kneading, a method in which the subject resin is molten under heating (preferably at high temperatures exceeding 150° C.) and uniformly kneaded with fillers and other additives. Melt-kneading is normally achieved by continuous melt-kneading using a single-screw kneading machine, a twin-screw kneading machine of the interlocking same-direction rotary type, interlocking different-direction rotary type, non-interlocking same-direction rotary type, non-interlocking different-direction rotary type, or other type, or by batch melt-kneading using a roll kneading machine, banbury kneading machine, or the like. The feeding of materials to the kneading machine may be achieved by the method in which a premix of the above-mentioned ingredients, separately weighed, is prepared using a commonly known mechanical mixer, such as the Henschel mixer, V blender or tumbler mixer, and fed to the kneading machine, or by the method in which ingredients are separately weighed using an automatic weighing machine and separately fed to the kneading machine.

The polyhydroxy alcohol ester of condensed hydroxyfatty acid and/or condensed hydroxyfatty acid having a degree of condensation exceeding 3 (hereinafter simply referred to as "polyhydroxy alcohol ester of condensed hydroxyfatty acid, etc.") for the present invention may be added at any time during the production of the resin composition. It is also possible to previously knead an inorganic filler and/or organic filler (hereinafter simply referred to as "filler"), a polyhydroxy alcohol ester of condensed hydroxyfatty acid, etc., or a filler and polyhydroxy alcohol ester of condensed hydroxyfatty acid, etc. (various additives according to necessity) with a particular thermoplastic resin (e.g., polypropylene resin, polyethylene resin, polystyrene resin, acrylonitrile-butadiene-styrene copolymer resin, polyvinyl chloride resin, and polyamide resin, with a preference given to polypropylene resin, polyethylene resin, polystyrene resin, polyamide resin), at a high concentration (e.g., for a filler, not lower than 5% by weight, preferably 30 to 98% by weight of the resin composition; not less than 0.5% by weight, preferably 1 to 20% by weight of the resin composition, for polyhydroxy alcohol ester of condensed hydroxyfatty acid, etc.), and blend and/or compound or mold the kneaded mixture, while diluting the mixture with another resin, a filler-containing resin, or the like.

In special cases, a thermoplastic resin, a filler, and a polyhydroxy alcohol ester of condensed hydroxyfatty acid, etc. may be directly fed to various molding machines and molded using a molding machine after the mixture is kneaded.

(6) Method of Molding Resin Composition

The method for molding the resin composition of the present invention is not limited. Usable molding methods include injection molding, extrusion molding, compression molding, sheet molding, lamination molding, hollow molding, vacuum molding and transfer molding.

The present invention will be explained in further detail by means of the following working Examples and Comparative Examples, but the present invention is not restricted to these Examples.

Production Example 1-1
(Production Example of Polyhydroxy Alcohol Ester of Condensed Hydroxyfatty Acid)

In a 1-liter four-necked flask, 500 g of 12-hydroxystearic acid (molecular weight=300, acid value=187.0) and 0.5 g of p-toluenesulfonic acid were placed; the reaction was carried out in a nitrogen gas stream at 180° C. for 15 hours while the resulting water was removed; and 475 g of condensed 12-hydroxystearic acid was obtained. The acid value of the reaction product was 45.5, demonstrating that the product had been esterified. The degree of condensation of this product was 4.1 (degree of condensation was calculated using the equation [acid value of fatty acid before condensation]/[acid value of fatty acid after condensation], as described above: 187.0/45.5=4.1). Next, 400 g of the condensed 12-hydroxystearic acid thus obtained (acid value=45.5, degree of condensation=4.1) and 30 g of hexaglycerol were mixed; the reaction was carried out in a nitrogen gas stream at 190° C. for 10 hours while the resulting water was removed; and 412 g of the polyhydroxy alcohol ester of condensed hydroxyfatty acid of the present invention was obtained. The acid value of the reaction product was 4.3, demonstrating that the product had been esterified.

Production Example 1-2
(Production Example of Polyhydroxy Alcohol Ester of Condensed Hydroxyfatty Acid)

In a 1-liter four-necked flask, 500 g of ricinoleic acid (molecular weight=298, acid value=188.3) was placed; the reaction was carried out in a nitrogen gas stream at 200° C. for 6 hours while the resulting water was removed; and 480 g of condensed ricinoleic acid was obtained. The acid value of the reaction product was 40.5, demonstrating that the product had been esterified. The degree of condensation of this product was 4.6 (degree of condensation was calculated using the equation [acid value of fatty acid before condensation]/[acid value of fatty acid after condensation], as described above: 188.3/40.5=4.6). Next, 400 g of the condensed ricinoleic acid thus obtained (acid value=40.5, degree of condensation=4.6) and 50 g of decaglycerol were mixed; the reaction was carried out in a nitrogen gas stream at 190° C. for 15 hours while the resulting water was removed; and 425 g of the polyhydroxy alcohol ester of condensed hydroxyfatty acid of the present invention was obtained. The acid value of the reaction product was 3.8, demonstrating that the product had been esterified.

Production Example 1-3
(Production Example of Polyhydroxy Alcohol Ester of Condensed Hydroxyfatty Acid)

In a 1-liter four-necked flask, 500 g of ricinoleic acid (molecular weight=298, acid value=188.3) and 0.5 g of sodium hydroxide were placed; the reaction was carried out in a nitrogen gas stream at 190° C. for 12 hours while the resulting water was removed; and 463 g of condensed ricinoleic acid was obtained. The acid value of the reaction product was 40.2, demonstrating that the product had been esterified. The degree of condensation of this product was 4.7 (degree of condensation was calculated using the equation [acid value of fatty acid before condensation]/[acid value of fatty acid after condensation], as described above: 188.3/40.2=4.7). Next, 400 g of the condensed ricinoleic acid thus obtained (acid value=40.2, degree of condensation=4.7) and 20 g of tetraglycerol were mixed; the reaction was carried out in a nitrogen gas stream at 190° C. for 7 hours while the resulting water was removed; and 398 g of the polyhydroxy alcohol ester of condensed hydroxyfatty acid of the present invention was obtained. The acid value of the reaction product was 1.4, demonstrating that the product had been esterified.

Production Example 1-4
(Production Example of Polyhydroxy Alcohol Ester of Condensed Hydroxyfatty Acid)

In a 1-liter four-necked flask, 500 g of ricinoleic acid (molecular weight=298, acid value=188.3) was placed; the reaction was carried out in a nitrogen gas stream at 200° C. for 6 hours while the resulting water was removed; and 480 g of condensed ricinoleic acid was obtained. The acid value of the reaction product was 40.5, demonstrating that the product had been esterified. The degree of condensation of this product was 4.6 (degree of condensation was calculated using the equation [acid value of fatty acid before condensation]/[acid value of fatty acid after condensation], as described above: 188.3/40.5=4.6). Next, 400 g of the condensed ricinoleic acid thus obtained (acid value=40.5, degree of condensation=4.6) and 30 g of hexaglycerol were mixed; the reaction was carried out in a nitrogen gas stream at 190° C. for 10 hours while the resulting water was removed; and 412 g of the polyhydroxy alcohol ester of condensed hydroxyfatty acid of the present invention was obtained. The acid value of the reaction product was 4.1, demonstrating that the product had been esterified.

Production Example 1-5
(Production Example of Polyhydroxy Alcohol Ester of Condensed Hydroxyfatty Acid)

In a 1-liter four-necked flask, 500 g of ricinoleic acid (molecular weight=298, acid value=188.3) was placed; the reaction was carried out in a nitrogen gas stream at 200° C. for 6 hours while the resulting water was removed; and 480 g of condensed ricinoleic acid was obtained. The acid value of the reaction product was 40.5, demonstrating that the product had been esterified. The degree of condensation of this product was 4.6 (degree of condensation was calculated using the equation [acid value of fatty acid before condensation]/[acid value of fatty acid after condensation], as described above: 188.3/40.5=4.6). Next, 400 g of the condensed ricinoleic acid thus obtained (acid value=40.5, degree of condensation=4.6) and 30 g of tetraglycerol were mixed; the reaction was carried out in a nitrogen gas stream at 190° C. for 15 hours while the resulting water was removed; and 425 g of the polyhydroxy alcohol ester of condensed hydroxyfatty acid of the present invention was obtained. The acid value of the reaction product was 3.8, demonstrating that the product had been esterified.

Production Example 1-6
(Production Example of Polyhydroxy Alcohol Ester of Condensed Hydroxyfatty Acid)

In a 1-liter four-necked flask, 284 g of stearic acid (acid value=197.6, degree of condensation=1.0), 462 g of hexaglycerol and 0.1 g of phosphoric acid were placed; the reaction was carried out in a nitrogen gas stream at 250° C. for 5 hours while the resulting water was removed; 690 g of polyhydroxy alcohol ester of non-condensed fatty acid was obtained. The acid value of the reaction product was 0.7, demonstrating that the product had been esterified.

Table 1-1 summarizes the properties of the polyhydroxy alcohol esters of condensed hydroxyfatty acids of Production Examples 1-1 to 1-5, and the polyhydroxy alcohol esters of fatty acid of Production Example 1-6.

TABLE 1-1

| No. | Polyhydroxy alcohols Kinds | Fatty acids Kinds | Molecular weight | Acid value | Acid value | Condensed hydroxyfatty acid Condensation degree | Polyhydroxy alcohol ester of condensed hydroxy-fatty acid Acid value |
|---|---|---|---|---|---|---|---|
| Production Example 1-1 | Hexaglycerol | 12-Hydroxystearic acid | 300 | 187.0 | 40.5 | 4.1 | 4.3 |
| Production Example 1-2 | Decaglycerol | Ricinoleic acid | 298 | 188.3 | 40.5 | 4.6 | 3.8 |
| Production Example 1-3 | Tetraglycerol | Ricinoleic acid | 298 | 188.3 | 40.2 | 4.7 | 1.4 |
| Production Example 1-4 | Hexaglycerol | Ricinoleic acid | 298 | 188.3 | 40.5 | 4.6 | 4.1 |
| Production Example 1-5 | Tetraglycerol | Ricinoleic acid | 298 | 188.3 | 40.5 | 4.6 | 3.8 |
| Production Example 1-6 | Hexaglycerol | Stearic acid | 284 | 197.6 | 197.6 | 1.0 | 0.7 |

Production Example 2-1
(Production Example of Condensed Hydroxyfatty Acid)

In a 1-liter four-necked flask, 500 g of 12-hydroxystearic acid of industrial grade (molecular weight=300, acid value=188.3) and 0.5 g of p-toluenesulfonic acid were placed; the reaction was carried out in a nitrogen gas stream at 180° C. for 15 hours while the resulting water was removed; and 475 g of condensed 12-hydroxystearic acid was obtained. The acid value of the reaction product was 45.5, demonstrating that the product had been esterified. The degree of condensation of this product was 4.1.

Production Example 2-2
(Production Example of Condensed Hydroxyfatty Acid)

In a 1-liter four-necked flask, 500 g of ricinoleic acid of industrial grade (molecular weight=298, acid value=188.3) were placed; the reaction was carried out in a nitrogen gas stream at 200° C. for 6 hours while the resulting water was removed; and 480 g of condensed ricinoleic acid was obtained. The acid value of the reaction product was 40.5, demonstrating that the product had been esterified. The degree of condensation of this product was 4.6.

Production Example 2-3
(Production Example of Condensed Hydroxyfatty Acid)

In a 1-liter four-necked flask, 500 g of 12-hydroxystearic acid of industrial grade (molecular weight=300, acid value=188.3) and 0.5 g of p-toluenesulfonic acid were placed; the reaction was carried out in a nitrogen gas stream at 180° C. for 12 hours while the resulting water was removed; and 483 g of condensed 12-hydroxystearic acid was obtained. The acid value of the reaction product was 53.8, demonstrating that the product had been esterified. The degree of condensation of this product was 3.5.

Production Example 2-4
(Production Example of Condensed Hydroxyfatty Acid)

In a 1-liter four-necked flask, 500 g of ricinoleic acid of industrial grade (molecular weight=298, acid value=188.3) were placed; the reaction was carried out in a nitrogen gas stream at 200° C. for 0.5 hours while the resulting water was removed; and 480 g of condensed ricinoleic acid was obtained. The acid value of the reaction product was 117.5, demonstrating that the product had been esterified. The degree of condensation of this product was 1.6. Table 2-1 summarizes the Production Examples.

TABLE 2-1

| | Fatty acids | | | | Condensed hydroxyfatty acid |
|---|---|---|---|---|---|
| No. | Kinds | Molecular weight | Acid value | Acid value | Condensation Degree |
| Production Example 2-1 | 12-Hydroxystearic acid | 300 | 188.3 | 45.5 | 4.1 |
| Production Example 2-2 | Ricinoleic acid | 298 | 188.3 | 40.5 | 4.6 |
| Production Example 2-3 | 12-Hydroxystearic acid | 300 | 188.3 | 53.8 | 3.5 |
| Production Example 2-4 | Ricinoleic acid | 298 | 188.3 | 117.5 | 1.6 |

The evaluation items and evaluation methods used in the Examples and Comparative Examples for the present invention are as follows:

1. Determination of Physical Properties

1) Melt Flow Rate

Determined in accordance with Method A specified in JIS K-7210. As for measuring conditions, polypropylene resin (PP) was measured at 230° C. with a testing load of 2.16 kg; polystyrene resin (PS) was measured at 200° C. with a testing load of 5 kg; and polyethylene resin (PE) was measured at 190° C. with a testing load of 2.16 kg.

2) Viscosity

For polyvinyl chloride resin, viscosity, as an index of flowability, was determined in accordance with Method S specified in JIS K-7117 before melt-kneading.

3) Tensile Strength Test

Tensile strength and elongation were determined in accordance with JIS K-7113.

4) Deflection Temperature Under Load

Deflection temperature under load was determined in accordance with JIS K-7207.

5) Heat Stability

Using a thermogravimetric weight analyzer, percent weight loss (% by weight) by heating at 250° C. for 30 minutes and weight loss (% by weight) by heating at 200° C. for 30 minutes were determined.

2. Evaluation of Compositions Having High Filler Content

Thermoplastic resin compositions having a high content (70 to 98% by weight of the total weight of resin composition) of an inorganic filler and/or organic filler were evaluated as follows:

1) Kneading Torque Determination

The materials in amounts shown in Tables 1-3 and 1-5 were placed in a Laboplastomill (Toyo Seiki Seisaku-sho Ltd., mill capacity 60 cc), and kneading torque was measured after 3-minute melt-kneading. As kneading torque decreases, moldability increases. Kneading temperature was set at 190° C. for polypropylene resin and 170° C. for polyethylene resin. The mill revolution rate was 30 rpm.

2) Sheet Evaluation

The materials in amounts shown in Tables 1-3, 1-5, 1-6 and 1-8 were placed in a desk-top compact roll mixing machine (Toyo Seiki Seisaku-sho, Ltd., 3 inches×6 inches), after the roll of the mixer was heated to 175° C. After all samples were charged, the mixture was kneaded for 3 minutes to yield a sheet. The appearance and strength of the sheet were evaluated visually.

Evaluation criteria:

Good ◄----------------------------------------► Poor

Experimental Results

EXAMPLES 1-1 THROUGH 1-6

To talc (Soapstone P, produced by Sobue Clay Co., Ltd.), each of the polyhydroxy alcohol ester of condensed hydroxyfatty acids of Production Examples 1-1 through 1-3, in an amount shown in Table 1-2, was added; this mixture was stirred at high rate using a Henschel mixer to achieve surface treatment of the filler. Twenty parts by weight of this filler was added to 80 parts by weight of an impact-resistant polypropylene resin (BC3L, produced by Mitsubishi Chemical Corporation); the mixture was melt-kneaded using a twin-screw extruder to yield pellets. Next, a test piece having a 2 mm thickness was molded using an injection molding machine, which was then subjected to physical property determination. The pellets themselves were also subjected to determination of melt flow rate and heat stability. The results are shown in Table 1-2.

Comparative Examples 1-1 Through 1-3

The same treatment and evaluation as those in Examples 1-1 through 1-6 were carried out, except that a filler not treated with polyhydroxy alcohol ester of condensed hydroxyfatty acid (Comparative Example 1-1), that the amount of polyhydroxy alcohol ester of condensed hydroxyfatty acid added was changed (Comparative Example 1-2), and that a fatty acid ester of polyhydroxy alcohol was used in lieu of polyhydroxy alcohol ester of condensed hydroxyfatty acid (Comparative Example 1-3). The results are shown in Table 1-2.

EXAMPLE 1-7 and

Comparative Examples 1-4 and 1-5

The same treatment and evaluation as those in Examples 1-1 through 1-6 and Comparative Examples 1-1 through 1-3 were carried out, except that the filler was replaced with calcium carbonate (NS-100, produced by Nitto Funka K. K.). The results are shown in Table 1-2.

EXAMPLE 1-8 and

Comparative Examples 1-6 and 1-7

The same treatment and evaluation as those in Examples 1-1 through 1-6 and Comparative Examples 1-1 through 1-3 were carried out, except that the resin was replaced with polystyrene resin (679R, produced by Asahi Chemical Industry Co., Ltd.). The results are shown in Table 1-2.

EXAMPLES 1-9 THROUGH 1-13

Each of the polyhydroxy alcohol ester of condensed hydroxyfatty acids of Production Examples 1-1 through 1-3, in an amount shown in Table 1-3, was added to talc; this mixture was stirred at high rate using a Henschel mixer to achieve surface treatment of the filler. Eighty parts by weight of this treated filler was added to 20 parts by weight of an impact-resistant polypropylene resin (BC3L, produced by Mitsubishi Chemical Corporation); and kneading torque determination and sheet evaluation as described in "the evaluation of compositions having high filler content" above were carried out. The results are shown in Table 1-3.

Comparative Examples 1-8 and 1-9

The same treatment and evaluation as those in Examples 1-9 through 1-13 were carried out, except that a talc not treated with polyhydroxy alcohol ester of condensed hydroxyfatty acid (Comparative Example 1-8) was used, and that a polyhydroxy alcohol ester of fatty acid was used in lieu of polyhydroxy alcohol ester of condensed hydroxyfatty acid (Comparative Example 1-9). The evaluation results are shown in Table 1-3.

EXAMPLE 1-14

Each of the polyhydroxy alcohol esters of condensed hydroxyfatty acids of Production Examples 1-1 through 1-3, in an amount shown in Table 1-3, was added to iron oxide (produced by Kawasaki Steel Corporation); this mixture was stirred at high rate using a Henschel mixer to achieve surface treatment of the filler. Eighty parts by weight of this treated filler was added to 20 parts by weight of an impact-resistant polypropylene resin (BC3L, produced by Mitsubishi Chemical Corporation); and kneading torque determination and sheet evaluation as described in "the evaluation of compositions having high filler content" above were carried out. The results are shown in Table 1-3.

Comparative Example 1-10 and 1-11

The same treatment and evaluation as those in Examples 1-9 through 1-13 were carried out, except that iron oxide not treated with polyhydroxy alcohol ester of condensed hydroxyfatty acid was used (Comparative Example 1-10) and that a polyhydroxy alcohol ester of fatty acid was used in lieu of polyhydroxy alcohol ester of condensed hydroxyfatty acid (Comparative Example 1-11). The evaluation results are shown in Table 1-3.

EXAMPLES 1-15 THROUGH 1-28

To each of two fillers, talc (Soapstone P, produced by Sobue Clay Co., Ltd.) and calcium carbonate (NS-100, produced by Nitto Funka Kogyo K. K.), each of the polyhydroxy alcohol esters of condensed hydroxyfatty acids of Production Examples 1-1 through 1-5, in an amount shown in Table 1-4, was added; this mixture was stirred at high rate using a Henschel mixer to achieve surface treatment of the filler. Forty parts by weight of this filler was added to 60 parts by weight of an impact-resistant polypropylene resin (BC3L, produced by Mitsubishi Chemical Corporation); the mixture was melt-kneaded using a twin-screw extruder to yield pellets. Next, a test piece having a 2 mm thickness was molded using an injection molding machine, which was then subjected to physical property determination. The pellets themselves were also subjected to determination of melt flow rate and heat stability. The results are shown in Table 1-4.

Comparative Examples 1-12 Through 1-17

The same treatment and evaluation as those in Examples 1-15 through 1-28 were carried out, except that a filler not treated with polyhydroxy alcohol ester of condensed hydroxyfatty acid was used (Comparative Examples 1-12, 15), that the amount of polyhydroxy alcohol ester of condensed hydroxyfatty acid added was changed (Comparative Examples 1-13, 16), and that a polyhydroxy alcohol ester of fatty acid was used (Comparative Examples 1-14, 17). The results are shown in Table 1-4.

EXAMPLES 1-29 THROUGH 1-40

Each of the polyhydroxy alcohol esters of condensed hydroxyfatty acids of Production Examples 1-1 through 1-5, in an amount shown in Table 1-5, was added to talc or calcium carbonate (the same fillers used in Examples 1-15 through 1-28); this mixture was stirred at high rate using a Henschel mixer to achieve surface treatment of the filler. Eighty parts by weight of this treated filler was added to 20 parts by weight of an impact-resistant polypropylene resin (the same resin as that used in Examples 1-15 through 1-28); and kneading torque determination and sheet evaluation as described in "the evaluation of compositions having high filler content" above were carried out. The results are shown in Table 1-5.

Comparative Examples 1-18 Through 1-21

The same treatment and evaluation as those in Examples 1-29 through 1-40 were carried out, except that a filler not treated with polyhydroxy alcohol ester of condensed hydroxyfatty acid was used (Comparative Examples 1-18, 20), and that a polyhydroxy alcohol ester of fatty acid was used (Comparative Examples 1-19, 21). The results are shown in Table 1-5.

EXAMPLES 1-41 THROUGH 1-46

Comparative Examples 1-22 and 1-23

The same treatment and evaluation as those in Examples 1-29 through 1-46 and in Comparative Examples 1-18 through 1-21 were carried out, except that iron oxide (the same one as that used in Example 1-14) was used as a filler. The results are shown in Table 1-6.

EXAMPLES 1-47 THROUGH 1-56

Comparative Examples 1-24 Through 1-29

The same treatment and evaluation as those in Examples 1-15 through 1-28 and in Comparative Examples 1-12 through 1-17 were carried out, except that high density polyethylene resin (HJ580, produced by Mitsubishi Chemical Corporation) or polystyrene resin (679R, produced by Asahi Chemical Industry), instead of impact resistant polypropylene resin, was used. The results are shown in Table 1-7.

EXAMPLES 1-57 THROUGH 1-60

Comparative Examples 1-30 and 1-31

The same treatment and evaluation as those in Examples 1-35 through 1-40 and in Comparative Examples 1-20 and 1-21 were carried out, except that high density polyethylene resin (HJ580, produced by Mitsubishi Chemical Corporation) was used instead of impact resistant polypropylene resin. The results are shown in Table 1-8.

EXAMPLES 1-61 THROUGH 1-65

Comparative Examples 1-32 Through 1-34

The same treatment and evaluation as those in Examples 1-15 through 1-28 and Comparative Examples 1-12 and 1-17 were carried out, except that the blending ratio of the resin composition was changed to polyvinyl chloride/plasticizer/filler=15/10/75 (% by weight), and that flowability was evaluated by measuring viscosity instead of melt flow rate. Here, TH-1000 (produced by Tosoh Corporation) was used as polyvinyl chloride resin, di-2-ethylhexyl phthalate (usually abbreviated as DOP), as plasticizer, and calcium carbonate (the same one as used in Examples 1-15 through 1-28), as filler. The results are shown in Table 1-9.

EXAMPLES 1-66 THROUGH 1-75

Comparative Examples 1-35 Through 1-40

The same treatment and evaluation as those in Examples 1-15 through 1-28 and Comparative Examples 1-12 and 1-17 were carried out, except that the resin was changed to polyamide resin (CM1017 (nylon 6), produced by Toray) was used. The results of the measurement are shown in Table 1-10.

TABLE 1-2

| No. | Resin Note 1) | Filler | Fatty acid esters Kinds Production Examples | Fatty acid esters Amount (% by wt.) Note 2) | Flow test Melt flow rate (g/10 min) | Strength test IZOD impact strength (with notch) (kg cm/cm) | Strength test Bending strength (kg/cm$^2$) | Heat stability Weight loss (%) at 250° C. for 30 min. | Heat stability Weight loss (%) at 200° C. for 30 min. |
|---|---|---|---|---|---|---|---|---|---|
| Example 1-1 | PP | Talc | 1-1 | 0.2 | 4.4 | 5.3 | 464 | 0.3 | 0.1 |
| Example 1-2 | PP | Talc | 1-1 | 0.5 | 4.6 | 5.4 | 461 | 0.3 | 0.1 |
| Example 1-3 | PP | Talc | 1-1 | 2.0 | 4.8 | 5.8 | 453 | 0.4 | 0.1 |
| Example 1-4 | PP | Talc | 1-1 | 15.0 | 7.0 | 4.8 | 424 | 0.8 | 0.2 |
| Example 1-5 | PP | Talc | 1-2 | 0.2 | 4.3 | 5.2 | 462 | 0.3 | 0.1 |
| Example 1-6 | PP | Talc | 1-3 | 0.2 | 4.2 | 5.3 | 467 | 0.3 | 0.1 |
| Comparative Example 1-1 | PP | Talc | — | 0 | 3.0 | 3.5 | 412 | 0.3 | 0.1 |
| Comparative Example 1-2 | PP | Talc | 1-1 | 25.0 | 9.0 | 3.2 | 354 | 1.2 | 0.4 |
| Comparative Example 1-3 | PP | Talc | 1-6 | 0.2 | 4.0 | 4.7 | 451 | 1.0 | 0.3 |
| Example 1-7 | PP | Calcium carbonate | 1-1 | 0.2 | 3.1 | 2.9 | 399 | 0.3 | 0.1 |
| Comparative Example 1-4 | PP | Calcium carbonate | — | 0 | 1.8 | 1.9 | 346 | 0.3 | 0.1 |
| Comparative Example 1-5 | PP | Calcium carbonate | 1-6 | 0.2 | 2.5 | 2.4 | 374 | 1.2 | 0.4 |
| Example 1-8 | PS | Talc | 1-1 | 0.2 | 4.0 | 4.3 | 491 | 0.2 | 0.1 |
| Comparative Example 1-6 | PS | Talc | — | 0 | 3.3 | 3.1 | 449 | 0.2 | 0.1 |
| Comparative Example 1-7 | PS | Talc | 1-6 | 0.2 | 3.8 | 3.7 | 459 | 0.9 | 0.2 |

Blending amount: Resin/Treated filler = 80/20 (% by weight)
Note 1) Resin: PP: Impact resistant polypropylene resin. PS: Polystyrene resin
Note 2) Addition amount (% by weight) based upon the amount of filler

TABLE 1-3

| No. | Resin Note 1) | Filler | Fatty acid esters Kinds Production Example | Fatty acid esters Amount (% by wt.) Note 2) | Evaluation of sheet Appearance Note 3) | Evaluation of sheet Strength Note 3) | Kneading test Kneading torque (kg · cm) |
|---|---|---|---|---|---|---|---|
| Example 1-9 | PP | Talc | 1-1 | 0.5 | ○ | ◎ | 1.7 |
| Example 1-10 | PP | Talc | 1-1 | 1.0 | ◎ | ◎ | 1.4 |
| Example 1-11 | PP | Talc | 1-1 | 5.0 | ◎ | ◎ | 0.9 |
| Example 1-12 | PP | Talc | 1-2 | 1.0 | ◎ | ◎ | 1.5 |
| Example 1-13 | PP | Talc | 1-3 | 1.0 | ◎ | ◎ | 1.5 |
| Comparative Example 1-8 | PP | Talc | — | 0 | Unable to knead | | 3.0 |
| Comparative Example 1-9 | PP | Talc | 1-6 | 1.0 | × | × | 2.0 |
| Example 1-14 | PP | Iron oxide | 1-1 | 1.0 | ◎ | ◎ | 2.0 |
| Comparative Example 1-10 | PP | Iron oxide | — | 0 | Unable to knead | | 3.8 |
| Comparative Example 1-11 | PP | Iron oxide | 1-6 | 1.0 | × | × | 2.7 |

Blending amount: Resin/Treated filler = 20/80 (% by wt.)
Note 1) Resin: PP: Impact resistant polypropyrene resin
Note 2) Addition amount (% by wt.) based upon the amount of filler
Note 3) Evaluation criteria
◎  ○  Δ  ×
Good <----------> Poor

TABLE 1-4

| No. | Resin Note 1) | Filler Note 2) | Fatty acid esters Kinds Production Examples | Fatty acid esters Amount (% by wt.) Note 3) | Flow test MFR (g/10 min) | Tensile test Strength (kg/cm$^2$) | Tensile test Elongation (%) | Deflection temperature under load 18.5 kg load (° C.) | Heat stability Weight loss (%) at 250° C. for 30 min. | Heat stability Weight loss (%) at 200° C. for 30 min. |
|---|---|---|---|---|---|---|---|---|---|---|
| Example 1-15 | PP | Talc | 1-4 | 0.1 | 5.0 | 372 | 37 | 135 | 0.1 | 0.0 |
| Example 1-16 | " | Talc | 1-4 | 1.0 | 6.0 | 374 | 45 | 137 | 0.1 | 0.0 |
| Example 1-17 | " | Talc | 1-4 | 5.0 | 6.3 | 371 | 52 | 138 | 0.1 | 0.0 |
| Example 1-18 | " | Talc | 1-4 | 15.0 | 6.5 | 367 | 55 | 136 | 0.2 | 0.1 |
| Example 1-19 | " | Talc | 1-5 | 1.0 | 5.9 | 372 | 43 | 137 | 0.1 | 0.0 |
| Example 1-20 | " | Talc | 1-1 | 1.0 | 5.3 | 372 | 39 | 137 | 0.1 | 0.0 |
| Example 1-21 | " | Talc | 1-3 | 1.0 | 5.0 | 370 | 35 | 135 | 0.1 | 0.0 |
| Comparative Example 1-12 | " | Talc | — | 0 | 4.5 | 370 | 33 | 134 | 0.1 | 0.0 |
| Comparative Example 1-13 | " | Talc | 1-4 | 30.0 | 7.0 | 352 | 47 | 128 | 0.5 | 0.3 |
| Comparative Example 1-14 | " | Talc | 1-6 | 1.0 | 4.4 | 365 | 28 | 131 | 0.4 | 0.2 |
| Example 1-22 | PP | Calcium carbonate | 1-4 | 0.1 | 3.6 | 255 | 30 | 124 | 0.1 | 0.0 |
| Example 1-23 | " | Calcium carbonate | 1-4 | 1.0 | 5.4 | 252 | 40 | 127 | 0.1 | 0.0 |
| Example 1-24 | " | Calcium carbonate | 1-4 | 5.0 | 6.1 | 248 | 44 | 128 | 0.1 | 0.0 |
| Example 1-25 | " | Calcium carbonate | 1-4 | 15.0 | 6.3 | 245 | 48 | 129 | 0.2 | 0.1 |
| Example 1-26 | " | Calcium carbonate | 1-5 | 1.0 | 5.2 | 251 | 38 | 127 | 0.1 | 0.0 |
| Example 1-27 | " | Calcium carbonate | 1-1 | 1.0 | 4.5 | 250 | 36 | 127 | 0.1 | 0.0 |
| Example 1-28 | " | Calcium carbonate | 1-3 | 1.0 | 3.7 | 254 | 29 | 124 | 0.1 | 0.0 |
| Comparative Example 1-15 | " | Calcium carbonate | — | 0 | 2.8 | 253 | 28 | 123 | 0.1 | 0.0 |
| Comparative Example 1-16 | " | Calcium carbonate | 1-4 | 30.0 | 7.2 | 231 | 47 | 120 | 0.5 | 0.3 |
| Comparative Example 1-17 | " | Calcium carbonate | 1-6 | 1.0 | 2.6 | 238 | 26 | 122 | 0.5 | 0.2 |

Blending amount: Resin/Treated filler = 60/40 (% by weight)
Note 1) Resin: PP: Impact resistant polypropylene resin (BC3L, Mitsubishi Chemical Corporation)
Note 2) Filler: Talc (Soapstone P, Sobue Clay Co., Ltd.)
Calcium carbonate (NS-100, Nitto Funka Kogyo K.K.)
Note 3) Addition amount (% by weight) based upon the amount of filler

TABLE 1-5

| No. | Resin Note 1) | Filler Note 2) | Fatty acid esters Kinds Production Example | Fatty acid esters Amount (% by wt.) Note 3) | Evaluation of sheet Appearance Note 4) | Evaluation of sheet Strength Note 4) | Kneading test Kneading torque (190° C.) (kg · cm) |
|---|---|---|---|---|---|---|---|
| Example 1-29 | PP | Talc | 1-4 | 0.5 | ○ | ○ | 1.6 |
| Example 1-30 | " | " | 1-4 | 1.0 | ○ | ○ | 1.3 |
| Example 1-31 | " | " | 1-4 | 5.0 | ⊙ | ⊙ | 0.8 |
| Example 1-32 | " | " | 1-5 | 1.0 | ○ | ○ | 1.5 |
| Example 1-33 | " | " | 1-1 | 1.0 | ○ | ○ | 1.8 |
| Example 1-34 | " | " | 1-3 | 1.0 | ○ | ○ | 2.0 |
| Comparative Example 1-18 | " | " | — | 0 | Unable to evaluate | Unable to evaluate | 2.3 |
| Comparative Example 1-19 | " | " | 1-6 | 1.0 | × | × | 2.3 |
| Example 1-35 | PP | Calcium carbonate | 1-4 | 0.5 | ○ | ○ | 1.9 |
| Example 1-36 | " | " | 1-4 | 1.0 | ○ | ○ | 1.7 |
| Example 1-37 | " | " | 1-4 | 5.0 | ⊙ | ⊙ | 1.3 |
| Example 1-38 | " | " | 1-2 | 1.0 | ○ | ○ | 1.7 |
| Example 1-39 | " | " | 1-1 | 1.0 | ○ | ○ | 1.9 |
| Example 1-40 | " | " | 1-3 | 1.0 | ○ | ○ | 2.2 |
| Comparative Example 1-20 | " | " | — | 0 | Unable to evaluate | Unable to evaluate | 3.0 |
| Comparative Example 1-21 | " | " | 1-6 | 1.0 | × | × | 3.0 |

Blending amount: Resin/Treated filler = 20/80 (% by wt.)
Note 1) Resin: PP: Impact resistant polypropyrene resin (BC3L, Mitsubishi Chemical Corporation)
Note 2) Filler: Talc (Soapstone P, Sobue Clay Co., Ltd.) Calcium carbonate (NS-100, Nitto Funka Kogyo K.K.)

TABLE 1-5-continued

|  |  |  | Fatty acid esters | | Evaluation of sheet | | Kneading test |
|---|---|---|---|---|---|---|---|
|  |  |  | Kinds | Amount |  |  | Kneading torque |
| No. | Resin Note 1) | Filler Note 2) | Production Example | (% by wt.) Note 3) | Appearance Note 4) | Strength Note 4) | (190° C.) (kg · cm) |

Note 3) Addition amount (% by wt.) based upon the amount of filler
Note 4) Evaluation criteria
⊚ ○ Δ × Unable to evaluate
Good <----------> Poor   Unable to knead

TABLE 1-6

| No. | Resin Note 1) | Filler Note 2) | Fatty acid esters | | Evaluation of sheet | | Kneading test |
|---|---|---|---|---|---|---|---|
|  |  |  | Kinds Production Example | Amount (% by wt.) Note 3) | Appearance Note 4) | Strength Note 4) | Kneading torque (190° C.) (kg · cm) |
| Example 1-41 | PP | Iron oxide | 1-4 | 0.5 | ○ | ○ | 3.0 |
| Example 1-42 | " | " | 1-4 | 1.0 | ○ | ○ | 2.3 |
| Example 1-43 | " | " | 1-4 | 5.0 | ⊚ | ⊚ | 2.1 |
| Example 1-44 | " | " | 1-2 | 1.0 | ○ | ○ | 2.4 |
| Example 1-45 | " | " | 1-1 | 1.0 | ○ | ○ | 2.6 |
| Example 1-46 | " | " | 1-3 | 1.0 | ○ | ○ | 3.1 |
| Comparative Example 1-22 | " | " | — | 0 | Unable to evaluate | Unable to evaluate | 3.8 |
| Comparative Example 1-23 | " | " | 1-6 | 1.0 | × | × | 3.9 |

Blending amount: Resin/Treated filler = 20/80 (% by wt.)
Note 1) Resin: PP: Impact resistant polypropyrene resin (BC3L, Mitsubishi Chemical Corporation)
Note 2) Filler: Iron oxide (Kawasaki Steel Co., Specific gravity 6 g/cm³)
Note 3) Addition amount (% by wt.) based upon the amount of filler
Note 4) Evaluation criteria
⊚ ○ Δ × Unable to evaluate
Good <----------> Poor   Unable to knead

TABLE 1-7

| No. | Resin Note 1) | Filler Note 2) | Fatty acid esters | | Flow test MFR (g/10 min) | Tensile test | | Load deflection Temperature 18.5 kg load (° C.) | Heat stability | |
|---|---|---|---|---|---|---|---|---|---|---|
|  |  |  | Kinds Production Examples | Amount (% by wt.) Note 3) |  | Strength (kg/cm²) | Elongation (%) |  | Weight loss (%) at 250° C. for 30 min. | Weight loss (%) at 200° C. for 30 min. |
| Example 1-47 | PE | Calcium carbonate | 1-4 | 0.1 | 9.0 | 51 | 77 | 57 | 0.1 | 0.0 |
| Example 1-48 | " | " | 1-4 | 1.0 | 14.3 | 50 | 83 | 57 | 0.1 | 0.0 |
| Example 1-49 | " | " | 1-4 | 5.0 | 15.8 | 49 | 87 | 58 | 0.1 | 0.0 |
| Example 1-50 | " | " | 1-4 | 15.0 | 16.5 | 45 | 89 | 58 | 0.2 | 0.1 |
| Example 1-51 | " | " | 1-2 | 1.0 | 14.0 | 48 | 80 | 57 | 0.1 | 0.0 |
| Comparative Example 1-24 | " | " | — | 0 | 8.4 | 50 | 75 | 56 | 0.1 | 0.0 |
| Comparative Example 1-25 | " | " | 1-4 | 30.0 | 16.3 | 37 | 71 | 52 | 0.5 | 0.3 |
| Comparative Example 1-26 | " | " | 1-6 | 1.0 | 8.6 | 42 | 73 | 53 | 0.4 | 0.2 |
| Example 1-52 | PS | Talc | 1-4 | 0.1 | 11.4 | 393 | 0.8 | 89 | 0.1 | 0.0 |
| Example 1-53 | " | " | 1-4 | 1.0 | 15.2 | 393 | 1.0 | 92 | 0.1 | 0.0 |
| Example 1-54 | " | " | 1-4 | 5.0 | 16.3 | 392 | 1.0 | 93 | 0.1 | 0.0 |
| Example 1-55 | " | " | 1-4 | 15.0 | 16.8 | 378 | 1.1 | 93 | 0.2 | 0.1 |
| Example 1-56 | " | " | 1-2 | 1.0 | 14.9 | 392 | 1.0 | 91 | 0.1 | 0.0 |
| Comparative Example 1-27 | " | " | — | 0 | 9.7 | 394 | 0.7 | 88 | 0.1 | 0.0 |

TABLE 1-7-continued

| | | | Fatty acid esters | | Flow test | Tensile test | | Load deflection Temperature 18.5 kg load (° C.) | Heat stability | |
|---|---|---|---|---|---|---|---|---|---|---|
| | | | Kinds | Amount | | | | | Weight loss (%) | Weight loss (%) |
| No. | Resin Note 1) | Filler Note 2) | Production Examples | (% by wt.) Note 3) | MFR (g/10 min) | Strength (kg/cm²) | Elongation (%) | | at 250° C. for 30 min. | at 200° C. for 30 min. |
| Comparative Example 1-28 | " | " | 1-4 | 30.0 | 16.5 | 372 | 0.5 | 88 | 0.5 | 0.3 |
| Comparative Example 1-29 | " | " | 1-6 | 1.0 | 10.2 | 385 | 0.6 | 85 | 0.4 | 0.2 |

Blending amount: Resin/Treated filler = 60/40 (% by weight)
Note 1) Resin: PE = High density polyethylene (HJ580, Mitsubishi Chemical Corporation)
PS = Polystyrene resin (679R, Asahi Chemical Industry)
Note 2) Filler: Talc (Soapstone P, Sobue Clay Co., Ltd.)
Calcium carbonate (NS-100, Nitto Funka Kogyo K.K.)
Note 3) Addition amount (% by weight) based upon the amount of filler

TABLE 1-8

| | | | Fatty acid esters | | Evaluation of sheet | | Kneading test |
|---|---|---|---|---|---|---|---|
| | | | Kinds | Amount | | | Kneading |
| No. | Resin Note 1) | Filler Note 2) | Production Examples | (% by wt.) Note 3) | Appearance Note 4) | Strength Note 4) | torque (170° C.) (kg · cm) |
| Example 1-57 | PE | Calcium carbonate | 1-4 | 0.5 | ○ | ○ | 1.9 |
| Example 1-58 | " | " | 1-4 | 1.0 | ⊚ | ○ | 1.6 |
| Example 1-59 | " | " | 1-4 | 5.0 | ⊚ | ⊚ | 1.2 |
| Example 1-60 | " | " | 1-2 | 1.0 | ○ | ○ | 1.5 |
| Comparative Example 1-30 | " | " | — | 0 | Unable to evaluate | Unable to evaluate | 2.1 |
| Comparative Example 1-31 | " | " | 1-6 | 1.0 | × | × | 2.1 |

Blending amount: Resin/Treated filler = 20/80 (% by wt.)
Note 1) Resin: PE = High density polyethylene (HJ580, Mitsubishi Chemical K.K.)
Note 2) Filler: Calcium carbonate (NS-100, Nitto Funka Kogyo K.K.)
Note 3) Addition amount (% by wt.) based on the amount of filler
Note 3) Evaluation criteria
   ⊚  ○  Δ  ×  Unable to evaluate
Good <----------> Poor  Unable to knead

TABLE 1-9

| | | | Fatty acid esters | | Viscosity test | Tensile test | |
|---|---|---|---|---|---|---|---|
| | | | Kinds | Amount | | | |
| No. | Resin Note 1) | Filler Note 2) | Production Examples | (% by wt.) Note 3) | Viscosity (cps) | Strength (kg/cm²) | Elongation (%) |
| Example 1-61 | PVC | Calcium carbonate | 1-4 | 0.1 | 300,000 | 238 | 49 |
| Example 1-62 | " | " | 1-4 | 1.0 | 15,000 | 240 | 54 |
| Example 1-63 | " | " | 1-4 | 5.0 | 7,200 | 243 | 56 |
| Example 1-64 | " | " | 1-4 | 15.0 | 6,300 | 244 | 60 |
| Example 1-65 | " | " | 1-2 | 1.0 | 17,000 | 242 | 53 |
| Comparative Example 1-32 | " | " | — | 0 | Unable to evaluate | 232 | 45 |
| Comparative Example 1-33 | " | " | 1-4 | 30.0 | 5,000 | 224 | 45 |
| Comparative Example 1-34 | " | " | 1-6 | 1.0 | Unable to evaluate | 226 | 41 |

Blending amount of filler: Resin/Plasticizer (DOP)/Treated filler = 15/10/75 (% by wt.)
DOP: Vinycizer 80K (Kao Co.)
Note 1) Resin: PVC: Polyvinyl chloride resin (TH-800, Tosoh Co.)
Note 2) Filler: Calcium carbonate (NS-100, Nitto Funka Kogyo K.K.)
Note 3) Addition amount (% by weight) based upon the amount of filler

TABLE 1-10

| | | | Fatty acid esters | | Tensile test | | Deflection temperature under load | Heat stability | |
|---|---|---|---|---|---|---|---|---|---|
| | | | | | | | | Weight loss (%) | Weight loss (%) |
| No. | Resin Note 1) | Filler Note 2) | Kinds Production Examples | Amount (% by wt.) Note 3) | Strength (kg/cm$^2$) | Elongation (%) | 18.5 kg load (° C.) | at 250° C. for 30 min. | at 200° C. for 30 min. |
| Example 1-66 | PA | Talc | 1-4 | 0.1 | 896 | 4.4 | 148 | 0.1 | 0.0 |
| Example 1-67 | " | " | 1-4 | 1.0 | 901 | 4.8 | 153 | 0.1 | 0.0 |
| Example 1-68 | " | " | 1-4 | 5.0 | 898 | 5.2 | 156 | 0.1 | 0.0 |
| Example 1-69 | " | " | 1-4 | 15.0 | 892 | 5.6 | 155 | 0.2 | 0.1 |
| Example 1-70 | " | " | 1-2 | 1.0 | 897 | 4.9 | 153 | 0.1 | 0.0 |
| Comparative Example 1-35 | " | " | — | 0 | 895 | 4.3 | 147 | 0.1 | 0.0 |
| Comparative Example 1-36 | " | " | 1-4 | 30.0 | 876 | 3.8 | 142 | 0.5 | 0.3 |
| Comparative Example 1-37 | " | " | 1-6 | 1.0 | 887 | 3.8 | 143 | 0.5 | 0.3 |
| Example 1-71 | PA | Calcium carbonate | 1-4 | 0.1 | 758 | 3.7 | 143 | 0.1 | 0.0 |
| Example 1-72 | " | " | 1-4 | 1.0 | 765 | 4.3 | 148 | 0.1 | 0.0 |
| Example 1-73 | " | " | 1-4 | 5.0 | 765 | 4.8 | 152 | 0.1 | 0.0 |
| Example 1-74 | " | " | 1-4 | 15.0 | 758 | 4.8 | 152 | 0.2 | 0.1 |
| Example 1-75 | " | " | 1-2 | 1.0 | 759 | 4.3 | 148 | 0.1 | 0.0 |
| Comparative Example 1-38 | " | " | — | 0 | 755 | 3.5 | 142 | 0.1 | 0.0 |
| Comparative Example 1-39 | " | " | 1-4 | 30.0 | 738 | 2.8 | 134 | 0.5 | 0.3 |
| Comparative Example 1-40 | " | " | 1-6 | 1.0 | 737 | 3.1 | 136 | 0.5 | 0.3 |

Blending amount: Resin/Treated filler = 60/40 (% by weight)
Note 1) Resin: PA = Polyamide (Nylon 6) resin (CM1007, Toray Industries)
Note 2) Filler: Talc (Soapstone P, Sobue Clay Co., Ltd.)
Calcium carbonate (NS-100, Nitto Funka Kogyo K.K.)
Note 3) Addition amount (% by weight) based upon the amount of filler

EXAMPLES 2-1 THROUGH 2-12

To each of two fillers, talc (Soapstone P, produced by Sobue Clay Co., Ltd.) and calcium carbonate (NS-100, produced by Nitto Funka Kogyo K. K.), each of the condensed hydroxyfatty acids of Production Examples 2-1 through 2-3, in an amount shown in Table 2-2, was added; this mixture was stirred at high rate using a Henschel mixer to achieve surface treatment of each filler. Forty parts by weight of each treated filler was added to 60 parts by weight of an impact-resistant polypropylene resin (BC3L, produced by Mitsubishi Chemical Corporation); the mixture was melt-kneaded using a twin-screw extruder to yield pellets. Next, a test piece having a 2 mm thickness was molded using an injection molding machine, which was then subjected to physical property determination. The pellets themselves were also subjected to the determination of melt flow rate and heat stability. The results are shown in Table 2-2.

Comparative Examples 2-1 Through 2-6

The same treatment and evaluation as those in Examples 2-1 through 2-12 were carried out, except that a filler not treated with condensed hydroxyfatty acid was used (Comparative Example 2-1, 4), that the amount of condensed hydroxyfatty acid added was changed (Comparative Examples 2-2, 5) and that a condensed hydroxyfatty acid having a degree of condensation not more than 3 was used (Comparative Examples 2-3, 6). The evaluation results are shown in Table 2-2.

EXAMPLE 2-13 THROUGH 2-27

To talc, calcium carbonate (both are the same ones as used in Examples 2-1 through 2-12) or iron oxide (produced by Kawasaki Steel Corporation, specific gravity 6 g/cm$^3$), each of the condensed hydroxyfatty acids of Production Examples 2-1 through 2-3, in an amount shown in Table 2-3, was added; this mixture was stirred at high rate using a Henschel mixer to achieve surface treatment of each filler. Eighty parts by weight of each treated filler was added to 20 parts by weight of an impact-resistant polypropylene resin (the same one as used in Examples 2-1 to 2-12); and kneading torque determination and sheet evaluation as described in "the evaluation of compositions having high filler content" above were carried out. The results are shown in Table 2-3.

Comparative Examples 2-7 Through 2-12

The same treatment and evaluation as those in Examples 2-13 through 2-27 were carried out, except that a filler was used without adding condensed hydroxyfatty acid (Comparative Example 2-7, 9, 11), and that a condensed hydroxyfatty acid having a degree of condensation of not more than 3 was used (Comparative Examples 2-8, 10, 12). The evaluation results are shown in Table 2-3.

EXAMPLES 2-28 THROUGH 2-32

Comparative Examples 2-13 Through 2-15

The same treatment and evaluation as those in Examples 2-1 through 2-12 and Comparative Examples 2-1 and 2-6 were carried out, except that the resin was changed to high density polyethylene resin (HJ580, Mitsubishi Chemical Corporation). The evaluation results are shown in Table 2-4.

EXAMPLES 2-33 THROUGH 2-37

Comparative Examples 2-16 Through 2-18

The same treatment and evaluation as those in Examples 2-1 through 2-12 and Comparative Examples 2-1 and 2-6 were carried out, except that the resin was changed to polystyrene resin (679R, produced by Asahi Chemical Industry). The measurement results are shown in Table 2-4.

EXAMPLES 2-38 THROUGH 2-41

Comparative Examples 2-19 and 2-20

The same treatment and evaluation as those in Examples 2-18 through 2-22 and Comparative Examples 2-9 and 2-10 were carried out, except that the resin was changed to high density polyethylene resin (HJ580, produced by Mitsubishi Chemical Corporation). The evaluation results are shown in Table 2-5.

EXAMPLES 2-42 THROUGH 2-46

Comparative Examples 2-21 Through 2-23

The same treatment and evaluation as those in Examples 2-1 through 2-12 and Comparative Examples 2-1 and 2-6 were carried out, except that the blending ratio of the resin composition was changed to polyvinyl chloride resin/plasticizer/filler=15/10/75 (% by weight), and that flowability was evaluated by measuring viscosity instead of melt flow rate. Here, TH-800 (produced by Tosoh Corporation) was used as polyvinyl chloride resin, di-2-ethylhexyl phthalate (usually abbreviated as DOP) (Vinycizer produced by Kao Corporation), as plasticizer, and calcium carbonate (the same one as that used in Examples 2-1 through 2-12), as filler. The evaluation results are shown in Table 2-6.

EXAMPLES 2-47 THROUGH 2-56

Comparative Examples 2-24 Through 2-29

The same treatment and evaluation as those in Examples 2-1 through 2-12 and Comparative Examples 2-1 through 2-6 were carried out, except that the resin was changed to polyamide resin (CM1017(nylon 6), produced by Toray). The results are shown in Table 2-7.

TABLE 2-2

| No. | Resin Note 1) | Filler Note 2) | Fatty acid esters Kinds Production Examples | Fatty acid esters Amount (% by wt.) Note 3) | Flow test MFR (g/10 min) | Tensile test Strength (kg/cm$^2$) | Tensile test Elongation (%) | Deflection temperature under load 18.5 kg load (°C.) | Heat stability Weight loss (%) at 250° C. for 30 min. | Heat stability Weight loss (%) at 200° C. for 30 min. |
|---|---|---|---|---|---|---|---|---|---|---|
| Example 2-1 | PP | Talc | 2-1 | 0.1 | 4.7 | 373 | 35 | 135 | 0.1 | 0.0 |
| Example 2-2 | " | " | 2-1 | 1.0 | 5.7 | 372 | 41 | 137 | 0.1 | 0.0 |
| Example 2-3 | " | " | 2-1 | 5.0 | 6.2 | 370 | 48 | 138 | 0.1 | 0.0 |
| Example 2-4 | " | " | 2-1 | 15.0 | 6.5 | 368 | 49 | 136 | 0.2 | 0.1 |
| Example 2-5 | " | " | 2-2 | 1.0 | 5.8 | 372 | 43 | 137 | 0.1 | 0.0 |
| Example 2-6 | " | " | 2-3 | 1.0 | 5.2 | 372 | 37 | 137 | 0.1 | 0.0 |
| Comparative Example 2-1 | " | " | — | 0 | 4.5 | 370 | 33 | 134 | 0.1 | 0.0 |
| Comparative Example 2-2 | " | " | 2-1 | 30.0 | 6.8 | 355 | 49 | 135 | 0.5 | 0.3 |
| Comparative Example 2-3 | " | " | 2-4 | 1.0 | 4.4 | 360 | 28 | 131 | 0.4 | 0.2 |
| Example 2-7 | PP | Calcium carbonate | 2-1 | 0.1 | 2.9 | 255 | 30 | 124 | 0.1 | 0.0 |
| Example 2-8 | " | " | 2-1 | 1.0 | 5.1 | 250 | 35 | 127 | 0.1 | 0.0 |
| Example 2-9 | " | " | 2-1 | 5.0 | 6.3 | 248 | 42 | 128 | 0.1 | 0.0 |
| Example 2-10 | " | " | 2-1 | 15.0 | 6.3 | 245 | 44 | 129 | 0.2 | 0.1 |
| Example 2-11 | " | " | 2-2 | 1.0 | 5.0 | 251 | 36 | 127 | 0.1 | 0.0 |
| Example 2-12 | " | " | 2-3 | 1.0 | 4.4 | 250 | 33 | 127 | 0.1 | 0.0 |
| Comparative Example 2-4 | " | " | — | 0 | 2.8 | 253 | 28 | 123 | 0.1 | 0.0 |
| Comparative Example 2-5 | " | " | 2-1 | 30.0 | 7.0 | 226 | 47 | 124 | 0.5 | 0.3 |
| Comparative Example 2-6 | " | " | 2-4 | 1.0 | 2.6 | 241 | 26 | 120 | 0.5 | 0.2 |

Blending amount: Resin/Treated filler = 60/40 (% by weight)
Note 1) Resin: PP: Impact resistant polypropylene resin (BC3L, Mitsubishi Chemical Corporation)
Note 2) Filler: Talc (Soapstone P, Sobue Clay Co., Ltd.)
Calcium carbonate (NS-100, Nitto Funka Kogyo K.K.)
Note 3) Addition amount (% by weight) based upon the amount of filler

TABLE 2-3

| No. | Resin Note 1) | Filler Note 2) |
|---|---|---|
| Example 2-13 | PP | Talc |
| Example 2-14 | " | " |
| Example 2-15 | " | " |
| Example 2-16 | " | " |
| Example 2-17 | " | " |
| Comparative Example 2-7 | " | " |
| Comparative Example 2-8 | " | " |
| Example 2-18 | PP | Calcium carbonate |
| Example 2-19 | " | " |
| Example 2-20 | " | " |
| Example 2-21 | " | " |
| Example 2-22 | " | " |
| Comparative Example 2-9 | " | " |
| Comparative Example 2-10 | " | " |
| Example 2-23 | PP | Iron oxide |
| Example 2-24 | " | " |
| Example 2-25 | " | " |
| Example 2-26 | " | " |
| Example 2-27 | " | " |
| Comparative Example 2-11 | " | " |
| Comparative Example 2-12 | " | " |

| No. | Fatty acid ester Kinds Production Examples | Amount (% by wt.) Note 3) |
|---|---|---|
| Example 2-13 | Production Example 2-1 | 0.5 |
| Example 2-14 | Production Example 2-1 | 1.0 |
| Example 2-15 | Production Example 2-1 | 5.0 |
| Example 2-16 | Production Example 2-2 | 1.0 |
| Example 2-17 | Production Example 2-3 | 1.0 |
| Comparative Example 2-7 | — | 0 |
| Comparative Example 2-8 | Production Example 2-4 | 1.0 |
| Example 2-18 | Production Example 2-1 | 0.5 |
| Example 2-19 | Production Example 2-1 | 1.0 |
| Example 2-20 | Production Example 2-1 | 5.0 |
| Example 2-21 | Production Example 2-2 | 1.0 |
| Example 2-22 | Production Example 2-3 | 1.0 |
| Comparative Example 2-9 | — | 0 |
| Comparative Example 2-10 | Production Example 2-4 | 1.0 |
| Example 2-23 | Production Example 2-1 | 0.5 |
| Example 2-24 | Production Example 2-1 | 1.0 |
| Example 2-25 | Production Example 2-1 | 5.0 |
| Example 2-26 | Production Example 2-2 | 1.0 |
| Example 2-27 | Production Example 2-3 | 1.0 |
| Comparative Example 2-11 | — | 0 |
| Comparative Example 2-12 | Production Example 2-4 | 1.0 |

| No. | Evaluation of sheet Appearance Note 4) | Evaluation of sheet Strength Note 4) | Kneading test Kneading torque (190° C.) (kg · cm) |
|---|---|---|---|
| Example 2-13 | ○ | ○ | 1.7 |
| Example 2-14 | ○ | ○ | 1.4 |
| Example 2-15 | ⊚ | ⊚ | 0.9 |
| Example 2-16 | ○ | ○ | 1.5 |
| Example 2-17 | ○ | ○ | 1.7 |
| Comparative Example 2-7 | Unable to evaluate | Unable to evaluate | 2.3 |
| Comparative Example 2-8 | × | × | 2.2 |
| Example 2-18 | ○ | ○ | 1.9 |
| Example 2-19 | ○ | ○ | 1.6 |
| Example 2-20 | ⊚ | ⊚ | 1.2 |
| Example 2-21 | ○ | ○ | 1.7 |
| Example 2-22 | ○ | ○ | 1.9 |
| Comparative Example 2-9 | Unable to evaluate | Unable to evaluate | 3.0 |
| Comparative Example 2-10 | × | × | 2.8 |
| Example 2-23 | ○ | ○ | 3.0 |
| Example 2-24 | ○ | ○ | 2.2 |
| Example 2-25 | ⊚ | ⊚ | 2.0 |
| Example 2-26 | ○ | ○ | 2.3 |
| Example 2-27 | ○ | ○ | 2.6 |
| Comparative Example 2-11 | Unable to evaluate | Unable to evaluate | 3.8 |
| Comparative Example 2-12 | × | × | 3.5 |

Blending amount: Resin/Treated filler = 20/80 by % by wt.)
Note 1) Resin: PP = Impact resistant polypropylene resin (BC3L, Mitsubishi Chemical Corporaiton)
Note 2) Filler: Talc (Soapstone, Sobue Clay Co., Ltd.)
Calcium Carbonate (NS-100, Nitto Funka Kogyo, K.K.)
Iron oxide (Kawasaki Steel Co., Specific gravity 6 g/cm³)
Note 3) Addition amount (% by wt.) based upon the amount of filler
Note 4) Evaluation criteria
⊚   ○   Δ   ×   Unable to evaluate
Good <---------> Poor   Unable to knead

TABLE 2-4

| No. | Resin Note 1) | Filler Note 2) | Fatty acid esters Kinds Production Examples | Fatty acid esters Amount (% by wt.) Note 3) | Flow test MFR (g/10 min) |
|---|---|---|---|---|---|
| Example 2-28 | PE | Calcium carbonate | 2-1 | 0.1 | 9.2 |
| Example 2-29 | " | " | 2-1 | 1.0 | 14.8 |
| Example 2-30 | " | " | 2-1 | 5.0 | 16.5 |
| Example 2-31 | " | " | 2-1 | 15.0 | 16.8 |
| Example 2-32 | " | " | 2-2 | 1.0 | 14.5 |
| Comparative Example 2-13 | " | " | — | 0 | 8.4 |
| Comparative Example 2-14 | " | " | 2-1 | 30.0 | 17.2 |
| Comparative Example 2-15 | " | " | 2-4 | 1.0 | 8.8 |
| Example 2-33 | PS | Talc | 2-1 | 0.1 | 10.3 |
| Example 2-34 | " | " | 2-1 | 1.0 | 14.5 |
| Example 2-35 | " | " | 2-1 | 5.0 | 15.8 |
| Example 2-36 | " | " | 2-1 | 15.0 | 16.0 |
| Example 2-37 | " | " | 2-2 | 1.0 | 14.4 |
| Comparative Example 2-16 | " | " | — | 0 | 9.7 |

TABLE 2-4-continued

| | | | | | |
|---|---|---|---|---|---|
| Comparative Example 2-17 | " | " | 2-1 | 30.0 | 16.2 |
| Comparative Example 2-18 | " | " | 2-4 | 1.0 | 10.2 |

| | Tensile test | | Deflection temperature under load | Heat stability | |
|---|---|---|---|---|---|
| | | | | Weight loss (%) | Weight loss (%) |
| No. | Strength (kg/cm$^2$) | Elongation (%) | 18.5 kg load (° C.) | at 250° C. for 30 min. | at 200° C. for 30 min. |
| Example 2-28 | 50 | 77 | 57 | 0.1 | 0.0 |
| Example 2-29 | 49 | 81 | 57 | 0.1 | 0.0 |
| Example 2-30 | 47 | 85 | 58 | 0.1 | 0.0 |
| Example 2-31 | 45 | 86 | 58 | 0.2 | 0.1 |
| Example 2-32 | 48 | 80 | 57 | 0.1 | 0.0 |
| Comparative Example 2-13 | 50 | 75 | 56 | 0.1 | 0.0 |
| Comparative Example 2-14 | 41 | 76 | 55 | 0.5 | 0.3 |
| Comparative Example 2-15 | 48 | 75 | 54 | 0.4 | 0.2 |
| Example 2-33 | 393 | 0.8 | 89 | 0.1 | 0.0 |
| Example 2-34 | 393 | 1.0 | 92 | 0.1 | 0.0 |
| Example 2-35 | 392 | 1.0 | 93 | 0.1 | 0.0 |
| Example 2-36 | 388 | 1.1 | 93 | 0.2 | 0.1 |
| Example 2-37 | 394 | 1.0 | 91 | 0.1 | 0.0 |
| Comparative Example 2-16 | 394 | 0.7 | 88 | 0.1 | 0.0 |
| Comparative Example 2-17 | 388 | 0.6 | 88 | 0.5 | 0.3 |
| Comparative Example 2-18 | 387 | 0.7 | 85 | 0.4 | 0.2 |

Blending amount: Resin/Treated filler = 60/40 (% by weight)
Note 1) Resin: PE = High density polyethylene (HJ580, Mitsubishi Chemical Corporation)
PS = Polystyrene resin (679R, Asahi Chemical Industry)
Note 2) Filler: Talc (Soapstone P, Sobue Clay Co., Ltd.)
Calcium carbonate (NS-100, Nitto Funka Kogyo, K.K.)
Note 3) Addition amount (% by weight) based upon the amount of filler

TABLE 2-5

| | | | Fatty acid esters | | Evaluation of sheet | | Kneading test |
|---|---|---|---|---|---|---|---|
| | | | Kinds | Amount | | | Kneading |
| No. | Resin Note 1) | Filler Note 2) | Production Examples | (% by wt.) Note 3) | Appearance Note 4) | Strength Note 4) | torque (170° C.) (kg · cm) |
| Example 2-38 | PE | Calcium carbonate | Production Example 2-1 | 0.5 | ○ | ○ | 1.8 |
| Example 2-39 | " | " | Production Example 2-1 | 1.0 | ⊙ | ○ | 1.5 |
| Example 2-40 | " | " | Production Example 2-1 | 5.0 | ⊙ | ⊙ | 1.2 |
| Example 2-41 | " | " | Production Example 2-2 | 1.0 | ○ | ○ | 1.4 |
| Comparative Example 2-19 | " | " | — | 0 | Unable to evaluate | Unable to evaluate | 2.1 |
| Comparative Example 2-20 | " | " | Production Example 2-4 | 1.0 | × | × | 2.0 |

Blending amount: Resin/Treated filler = 20/80 (% by wt.)
Note 1) Resin: PE = High density polyethylene (HJ580, Mitsubishi Chemical K.K.)
Note 2) Filler: Calcium carbonate (NS-100, Nitto Funka Kogyo, K.K.)
Note 3) Addition amount (% by wt.) based on the amount of filler
Note 3) Evaluation criteria
⊙　○　△　×　Unable to evaluate
Good <----------> Poor　Unable to knead

TABLE 2-6

| | | | Fatty acid esters | | Viscosity test | Tensile test | |
|---|---|---|---|---|---|---|---|
| | | | | Amount | | | |
| No. | Resin Note 1) | Filler Note 2) | Kinds Production Example | (% by wt.) Note 3) | Viscosity (cps) | Strength (kg/cm$^2$) | Elongation (%) |
| Example 2-42 | PVC | Calcium carbonate | Production Example 2-1 | 0.1 | 300,000 | 238 | 48 |
| Example 2-43 | " | " | Production Example 2-1 | 1.0 | 10,000 | 242 | 55 |
| Example 2-44 | " | " | Production Example 2-1 | 5.0 | 6,800 | 245 | 57 |
| Example 2-45 | " | " | Production Example 2-1 | 15.0 | 6,000 | 246 | 59 |

TABLE 2-6-continued

| | | | Fatty acid esters | | Viscosity test | Tensile test | |
|---|---|---|---|---|---|---|---|
| No. | Resin Note 1) | Filler Note 2) | Kinds Production Example | Amount (% by wt.) Note 3) | Viscosity (cps) | Strength (kg/cm$^2$) | Elongation (%) |
| Example 2-46 | " | " | Production Example 2-2 | 1.0 | 11,000 | 242 | 54 |
| Comparative Example 2-21 | " | " | — | 0 | Unable to evaluate | 232 | 45 |
| Comparative Example 2-22 | " | " | Production Example 2-1 | 30.0 | 5,000 | 233 | 47 |
| Comparative Example 2-23 | " | " | Production Example 2-4 | 1.0 | Unable to evaluate | 230 | 46 |

Blending amount of filler: Resin/Plasticizer (DOP)/Treated filler = 15/10/75 (% by wt.)
DOP: Vinycizer 80K (Kao Co.)
Note 1) Resin: PVC: Polyvinyl chloride resin (TH-800, Tosoh Co.)
Note 2) Filler: Calcium carbonate (NS-100, Nitto Funka Kogyo, K.K.)
Note 3) Addition amount (% by weight) based upon the amount of filler

TABLE 2-7

| | | | Fatty acid esters | |
|---|---|---|---|---|
| No. | Resin Note 1) | Filler Note 2) | Kinds Production Examples | Amount (% by wt.) Note 3) |
| Example 2-47 | PA | Talc | 2-1 | 0.1 |
| Example 2-48 | " | " | 2-1 | 1.0 |
| Example 2-49 | " | " | 2-1 | 5.0 |
| Example 2-50 | " | " | 2-1 | 15.0 |
| Example 2-51 | " | " | 2-2 | 1.0 |
| Comparative Example 2-24 | " | " | — | 0 |
| Comparative Example 2-25 | " | " | 2-1 | 30.0 |
| Comparative Example 2-26 | " | " | 2-4 | 1.0 |
| Example 2-52 | PA | Calcium carbonate | 2-1 | 0.1 |
| Example 2-53 | " | " | 2-1 | 1.0 |
| Example 2-54 | " | " | 2-1 | 5.0 |
| Example 2-55 | " | " | 2-1 | 15.0 |
| Example 2-56 | " | " | 2-2 | 1.0 |
| Comparative Example 2-27 | " | " | — | 0 |
| Comparative Example 2-28 | " | " | 2-1 | 30.0 |
| Comparative Example 2-29 | " | " | 2-4 | 1.0 |

| | Tensile test | | Deflection temperature under load | Heat stability | |
|---|---|---|---|---|---|
| | | | | Weight loss (%) | Weight loss (%) |
| No. | Strength (kg/cm$^2$) | Elongation (%) | 18.5 kg load (° C.) | at 250° C. for 30 min. | at 200° C. for 30 min. |
| Example 2-47 | 898 | 4.4 | 148 | 0.1 | 0.0 |
| Example 2-48 | 897 | 4.7 | 152 | 0.1 | 0.0 |
| Example 2-49 | 895 | 5.0 | 155 | 0.1 | 0.0 |
| Example 2-50 | 894 | 5.2 | 156 | 0.2 | 0.1 |
| Example 2-51 | 898 | 4.8 | 153 | 0.1 | 0.0 |
| Comparative Example 2-24 | 895 | 4.3 | 147 | 0.1 | 0.0 |
| Comparative Example 2-25 | 880 | 4.4 | 145 | 0.5 | 0.3 |
| Comparative Example 2-26 | 890 | 3.8 | 143 | 0.5 | 0.3 |
| Example 2-52 | 758 | 3.7 | 143 | 0.1 | 0.0 |
| Example 2-53 | 763 | 4.2 | 147 | 0.1 | 0.0 |
| Example 2-54 | 765 | 4.5 | 150 | 0.1 | 0.0 |
| Example 2-55 | 765 | 4.6 | 151 | 0.2 | 0.1 |
| Example 2-56 | 763 | 4.3 | 148 | 0.1 | 0.0 |
| Comparative Example 2-27 | 755 | 3.5 | 142 | 0.1 | 0.0 |

TABLE 2-7-continued

| | | | | | |
|---|---|---|---|---|---|
| Comparative Example 2-28 | 745 | 3.5 | 140 | 0.5 | 0.3 |
| Comparative Example 2-29 | 740 | 3.0 | 138 | 0.5 | 0.3 |

Blending amount: Resin/Treated filler = 60/40 (% by weight)
Note 1) Resin: PA = Polyamide (Nylon 6) resin (CM1007, Toray Industries)
Note 2) Filler: Talc (Soapstone P, Sobue Clay Co., Ltd.)
Calcium carbonate (NS-100, Nitto Funka Kogyo, K.K.)
Note 3) Addition amount (% by weight) based upon the amount of filler Industrial Applicability The present invention relates to a quality-improver for a filler-containing thermoplastic resin, the quality-improver mainly comprising a polyhydroxy alcohol ester of condensed hydroxyfatty acid, and to a thermoplastic resin composition which contains (A) a thermoplastic resin, (B) an inorganic filler and/or organic filler, and (C) a polyhydroxy alcohol ester of condensed hydroxyfatty acid and a production method thereof. By the present invention, a thermoplastic resin composition having good flowability and toughness, and improved impact strength, bending strength and other mechanical properties, and heat stability can be obtained. Also, the present invention makes it possible to knead a thermoplastic composition containing a high amount of filler by adding a polyhydroxy alcohol ester of condensed hydroxyfatty acid, thereby permitting the production of a resin composition which contains an inorganic filler and/or organic filler at a high concentration of not lower than 70% by weight.

What is claimed is:

1. A thermoplastic resin composition, comprising:
   (A) a thermoplastic resin selected from the group consisting of low-density polyethylene, high-density polyethylene, linear polyethylene, polypropylene, polyvinyl chloride, polystyrene, and acrylonitrile-butadiene-styrene copolymer;
   (B) an inorganic filler and/or an organic filler; and
   (C) a polyhydroxy alcohol ester of a condensed hydroxyfatty acid and/or (C') a condensed hydroxyfatty acid having a degree of condensation of 4 to 7.

2. The thermoplastic resin composition according to claim 1, wherein a condensed hydroxyfatty acid, which is a constituent of (C) a polyhydroxy alcohol ester of condensed hydroxyfatty acid, is a product obtained by a dehydration polymerization of one or more kinds selected from the group consisting of C12 to C20 hydroxyfatty acids.

3. The thermoplastic resin composition according to claim 2, wherein the condensed hydroxyfatty acid, which is a constituent of (C) a polyhydroxy alcohol ester of condensed hydroxyfatty acid, is a product obtained by a dehydration polymerization of one or more kinds selected from the group consisting of 9-hydroxystearic acid, 10-hydroxystearic acid, 12-hydroxystearic acid, ricinoleic acid, and hydrogenated castor oil.

4. The thermoplastic resin composition according to claim 1, wherein the condensed hydroxyfatty acid, which is a constituent of (C) a polyhydroxy alcohol ester of condensed hydroxyfatty acid, has a degree of condensation exceeding 1.

5. The thermoplastic resin composition according to claim 4, wherein the condensed hydroxyfatty acid has a degree of condensation of 3.5 to 7.

6. The thermoplastic resin composition according to claim 1, wherein the polyhydroxy alcohol, which is a constituent of (C) a polyhydroxy alcohol ester of condensed hydroxyfatty acid, is one or more kinds selected from the group consisting of polyglycerol and pentaerythritol.

7. The thermoplastic resin composition according to claim 6, wherein the polyhydroxy alcohol, which is a constituent of (C) a polyhydroxy alcohol ester of condensed hydroxyfatty acid, is one or more polyglycerols selected from the group consisting of diglycerol, triglycerol, tetraglycerol, pentaglycerol, hexaglycerol, and decaglycerol.

8. The thermoplastic resin composition according to claim 1, wherein (C) a polyhydroxy alcohol ester of condensed hydroxyfatty acid is one or more compounds selected from the group consisting of a tetraglycerol ester of condensed ricinoleic acid, a hexaglycerol ester of condensed ricinoleic acid, an octaglycerol ester of condensed ricinoleic acid, a decaglycerol ester of condensed ricinoleic acid, a tetraglycerol ester of condensed 12-hydroxystearic acid, a hexaglycerol ester of condensed 12-hydroxystearic acid, an octaglycerol ester of condensed 12-hydroxystearic acid, and a decaglycerol ester of condensed 12-hydroxystearic acid.

9. The thermoplastic resin composition according to claim 1, wherein the condensed hydroxyfatty acid has a degree of condensation of from 4.1 to 7.

10. The thermoplastic resin composition according to claim 1, wherein the condensed hydroxyfatty acid (C') is formed from one or more hydroxycarboxylic acids selected from the group consisting of ricinoleic acid, 9-hydroxystearic acid, 10-hydroxystearic acid, 12-hydroxystearic acid, and fatty acids derived from hydrogenated castor oil.

11. The thermoplastic resin composition according to claim 1, wherein (B) an inorganic filler and/or organic filler is one or more substances selected from the group consisting of extenders, reinforcements, ceramics, flame retardants, and magnetic materials.

12. The thermoplastic resin composition according to claim 11, wherein (B) an inorganic filler and/or organic filler is one or more substances selected from the group consisting of calcium carbonate, talc, clay, kaolin, aluminum hydroxide, magnesium hydroxide, barium sulfate, iron oxide, titanium oxide, glass beads, glass fibers, carbon fibers, aramid fibers, decabromodiphenyl ether and wood flours.

13. The thermoplastic resin composition according to claim 1, wherein the thermoplastic resin composition comprises an inorganic filler and/or an organic filler in an amount of 0.01 to 98% by weight of the composition and a polyhydroxy alcohol ester of a condensed hydroxyfatty acid and/or a condensed hydroxyfatty acid in an amount of 0.05 to 20 parts by weight based upon 100 parts by weight of the inorganic filler and/or the organic filler.

14. A method for producing the thermoplastic resin according to claim 1, comprising the steps of:
   blending the polyhydroxy alcohol ester of a condensed hydroxyfatty acid and/or the condensed hydroxyfatty acid with a thermoplastic resin selected from the group consisting of low-density polyethylene, high-density polyethylene, linear polyethylene, polypropylene, polyvinyl chloride, polystyrene, and acrylonitrile-butadiene-styrene copolymer previously blended with the inorganic filler and/or the organic filler; and melt-kneading the resulting mixture.

15. A method for producing the thermoplastic resin composition according to claim 1, comprising the steps of:

blending the polyhydroxy alcohol ester of a condensed hydroxyfatty acid and/or the condensed hydroxyfatty acid at a high concentration with the thermoplastic resin selected from the group consisting of low-density polyethylene, high-density polyethylene, linear polyethylene, polypropylene, polyvinyl chloride, polystyrene, and acrylonitrile-butadiene-styrene copolymer previously blended with the inorganic filler and/or the organic filler; and blending and/or compounding the above mixture while diluting the mixture with the thermoplastic resin or the thermoplastic resin previously blended with the inorganic filler and/or the organic filler.

16. A method of improving mechanical properties including flowability, toughness, impact strength and bending strength, and heat stability of a thermoplastic resin composition comprising a thermoplastic resin and a filler, said method comprising the steps of:

blending a polyhydroxy alcohol ester of a condensed hydroxyfatty acid and/or a condensed hydroxyfatty acid having a degree of condensation of 4 to 7 with a thermoplastic resin selected from the group consisting of low-density polyethylene, high-density polyethylene, linear polyethylene, polypropylene, polyvinyl chloride, polystyrene, and acrylonitrile-butadiene-styrene copolymer wherein, said thermoplastic resin has been previously blended with an inorganic filler and/or an organic filler; and melt-kneading the resulting mixture.

17. A method of improving mechanical properties including flowability, toughness, impact strength and bending strength, and heat stability of a thermoplastic resin composition comprising a thermoplastic resin and a filler, said method comprising the steps of:

blending a polyhydroxy alcohol ester of a condensed hydroxyfatty acid and/or a condensed hydroxyfatty acid having a degree of condensation of 4 to 7 at a high concentration with a thermoplastic resin selected from the group consisting of low-density polyethylene, high-density polyethylene, linear polyethylene, polypropylene, polyvinyl chloride, polystyrene, and acrylonitrile-butadiene-styrene copolymer wherein, said thermoplastic resin has been previously blended with an inorganic filler and/or an organic filler; and blending and/or compounding the above mixture while diluting the mixture with the thermoplastic resin or the thermoplastic resin that has been previously blended with the inorganic filler and/or the organic filler.

18. The thermoplastic resin composition according to claim 13, wherein the inorganic filler and/or the organic filler is present in an amount of 70 to 98% by weight.

19. A thermoplastic resin composition, comprising:

(A) a thermoplastic resin selected from the group consisting of low-density polyethylene, high-density polyethylene, linear polyethylene, polypropylene, polyvinyl chloride, polystyrene, and acrylonitrile-butadiene-styrene copolymer;

(B) an inorganic filler and/or an organic filler; and (C') a condensed hydroxyfatty acid having a degree of condensation of 4 to 7.

20. The thermoplastic resin composition according to claim 19, further comprising (C) a polyhydroxy alcohol ester of a condensed hydroxyfatty acid.

* * * * *

UNITED STATES PATENT AND TRADEMARK OFFICE
CERTIFICATE OF CORRECTION

PATENT NO.    : 6,344,509 B1
DATED         : February 5, 2002
INVENTOR(S)   : Yoshinobu Mizutani It is certified that error appears in the above-identified patent and that said Letters Patent is hereby corrected as shown below:

<u>Title page,</u>
Item [22], should read -- PCT Filed:  Dec. 12, 1995" should read -- PCT Filed: Dec. 21, 1995 --

Signed and Sealed this

Twenty-second Day of October, 2002

*Attest:*

*Attesting Officer*

JAMES E. ROGAN
*Director of the United States Patent and Trademark Office*